US011079520B2

(12) United States Patent
Tsai et al.

(10) Patent No.: US 11,079,520 B2
(45) Date of Patent: *Aug. 3, 2021

(54) BROADBAND ACHROMATIC METALENS IN THE VISIBLE SPECTRUM

(71) Applicant: ACADEMIA SINICA, Taipei (TW)

(72) Inventors: Din-Ping Tsai, Taipei (TW); Pin-Chieh Wu, Tainan (TW)

(73) Assignee: Academia Sinica, Taipei (TW)

( * ) Notice: Subject to any disclaimer, the term of this patent is extended or adjusted under 35 U.S.C. 154(b) by 178 days.

This patent is subject to a terminal disclaimer.

(21) Appl. No.: 16/231,868

(22) Filed: Dec. 24, 2018

(65) Prior Publication Data
US 2019/0196068 A1 Jun. 27, 2019

Related U.S. Application Data

(60) Provisional application No. 62/610,432, filed on Dec. 26, 2017.

(51) Int. Cl.
*G02B 5/00* (2006.01)
*G02F 1/00* (2006.01)
*G02B 1/00* (2006.01)
*B82Y 20/00* (2011.01)

(52) U.S. Cl.
CPC ............ *G02B 5/008* (2013.01); *G02B 1/002* (2013.01); *G02F 1/0063* (2013.01); *B82Y 20/00* (2013.01)

(58) Field of Classification Search
CPC ....... G02B 5/008; G02B 1/002; G02F 1/0063; B82Y 20/00
USPC ........................................ 359/279, 362, 642
See application file for complete search history.

(56) References Cited

U.S. PATENT DOCUMENTS

| 2015/0309218 A1 | 10/2015 | Shalaev et al. |
| 2017/0082263 A1 | 3/2017 | Byrnes et al. |
| 2017/0146806 A1 | 5/2017 | Lin et al. |
| 2019/0196220 A1* | 6/2019 | MacInnis ............... G02C 7/022 |

(Continued)

FOREIGN PATENT DOCUMENTS

WO WO-2017/176921 A1 10/2017

OTHER PUBLICATIONS

Luo, Principles of electromagnetic waves in metasurfaces. Science China Physics, Mechanics & Astronomy, vol. 58, No. 9, 2015, 18 pages, 58-9.

(Continued)

*Primary Examiner* — William Choi
(74) *Attorney, Agent, or Firm* — Muncy, Geissler, Olds & Lowe, P.C.

(57) ABSTRACT

In this disclosure, an optical component which comprises an array of metalenses is provided. Each metalens comprises a plurality of nanostructures and a dielectric layer and the nanostructures are disposed on the dielectric layer, and the nanostructures comprises an array of first phase compensation structures, and an array of second phase compensation structures. The array of the first phase compensation structures are disposed to surround the array of the second phase compensation structures so as to define a single metalens. The first and second phase compensation structures are complementary to each other and substantially satisfy the Babinet's principle.

14 Claims, 20 Drawing Sheets
(2 of 20 Drawing Sheet(s) Filed in Color)

(56) References Cited

U.S. PATENT DOCUMENTS

2020/0225386 A1* 7/2020 Tsai .................. G02B 1/002

OTHER PUBLICATIONS

Pu et al., Catenary optics for achromatic generation of perfect optical angular momentum. Sci. Adv. Oct. 2, 2015, 6 pages.
Hsiao et al., Fundamentals and applications of metasurfaces. Small Methods, 2017, 20 pages.
Genevet et al.. Recent advances in planar optics: from plasmonic to dielectric metasurfaces, Optica, vol. 4, No. 1, Nov. 4, 2016, pp. 139-152, 4-1.
Yu and Capasso, Flat optics with designer metasurfaces. Nat. Mater. 13, 139-150, Jan. 23, 2014.
Wu et al., Versatile polarization generation with an aluminum plasmonic metasurface, Nano Lett, Dec. 5, 2016, pp. 445-452.
Li et al., Plasmonic polarization generator in well-routed beaming, Light Sci. Appl. 4, 2015, 5 pages.
Wu et al., Broadband wide-Angle multifunctional polarization converter via liquid-metal-based metasurface, Adv. Opt. Mater, 2017, 7 pages.
Li et al., Multicolor 3D meta-holography by broadband plasmonic modulation, Sci. Adv. vol. 2, Nov. 4, 2016, 7 pages.
Huang et al. Broadband hybrid holographic multiplexing with geometric metasurfaces., 2015. Adv. Mater., pp. 6444-6449.
Huang et al., Aluminum plasmonic multicolor meta-hologram, Nano Lett., vol. 15 Apr. 6, 2015, pp. 3122-3127.
Wu et al., Self-affine graphene metasurfaces for tunable broadband absorption, Phy. Rev. Applied, vol. 6, Oct. 28, 2016, 8 pages.
Sherrot et al., Experimental demonstration of >230° phase modulation in gate-tunable graphene-gold reconfigurable mid-infrared metasurfaces. Nano Lett, vol. 17, Apr. 26, 2017, pp. 3027-3034, 17.
Thyagarajan et al., Metasurfaces: Millivolt modulation of plasmonic metasurface optical response via ionic conductance, Adv. Mater., 2017, 8 pages.
Huang et al., Gate-tunable conducting oxide metasurfaces, Nano Lett., vol. 16, Aug. 26, 2016, pp. 5319-5325.
Arbabi et al., Planar metasurface retroreflector, Nat. Photon. Jun. 19, 2017, pp. 415-420.
Luo & Ishihara, Surface plasmon resonant interference nanolithography technique, Appl. Phys. Lett., vol. 84, 2004, pp. 4780-4782, 84-23.
Chen et al., GaN metalens for pixel-level full-color routing at visible light, Nano Lett., vol. 17, Sep. 11, 2017, pp. 6345-6352, 17.
Arbabi et al., Dielectric metasurfaces for complete control of phase and polarization with subwavelength spatial resolution and high transmission, Nat. Nano., vol. 10, Aug. 31, 2015, pp. 937-943, 35.
Khorasaninejad et al., Metalenses at visible wavelengths: Diffraction-limited focusing and subwavelength resolution imaging, Science, vol. 352, Jun. 3, 2016, pp. 1190-1194, 352-6290.
Khorasaninejad et al., Achromatic metasurface lens at telecommunication wavelengths, Nano Lett., Jul. 13, 2015, 15, pp. 5358-5362.
Aieta et al., Multiwavelength achromatic metasurfaces by dispersive phase compensation, Science, vol. 347, Feb. 15, 2015, pp. 1342-1345, 347-6228.
Avayu et al., Composite functional metasurfaces for multispectral achromatic optics, Nat. Commun., Apr. 5, 2017, 7 pages.
Hu et al., Plasmonic lattice lenses for multiwavelength achromatic focusing, ACS Nano, vol. 10, Oct. 27, 2016, pp. 10275-10282, 10.
Khorasaninejad et al., Achromatic metalens over 60 nm bandwidth in the visible and metalens with reverse chromatic dispersion, Nano Lett., vol. 17, pp. 1819-1824, Jan. 26, 2017.
Arbabi et al., Controlling the sign of chromatic dispersion in diffractive optics with dielectric metasurfaces, Optica vol. 4, No. 6, Jun. 7, 2017, pp. 625-632, 4-6.
Wang et al., Broadband achromatic optical metasurface devices, Nat. Commun, vol. 8, Dec. 2017, 9 pages, 8-187.
Khorasaninejad et al., Multispectral chiral imaging with a metalens, Nano Lett., vol. 16, Jun. 7, 2017, pp. 4595-4600.
Khorasaninejad et al., Broadband and chiral binary dielectric meta-holograms, Sci. Adv., vol. 2, May 13, 2016.
Hentschel et al., Babinet to the half: Coupling of solid and inverse plasmonic structures, Nano Lett., vol. 13, Aug. 21, 2013, pp. 4428-4433, 13.
Wen et al., Metasurface device with helicity-dependent functionality, Adv. Opt. Mater., vol. 4, 2015, pp. 321-327.
Zheng et al., Metasurface holograms reaching 80% efficiency, Nat. Nano., Feb. 23, 2015, pp. 308-312.
Kamali et al., Decoupling optical function and geometrical form using conformal flexible dielectric metasurfaces, Nat. Commun., vol. 7, May 19, 2016, 7 pages.
Arbabi et al., Subwavelength-thick lenses with high numerical apertures and large efficiency based on high-contrast transmitarrays, Nat. Commun., vol. 6, May 7, 2015, 7 pages.
Wang et al., Chromatic-aberration-corrected diffractive lenses for ultra-broadband focusing, Sci. Rep., vol. 6, Feb. 12, 2016, 7 pages.
Li et al., Achromatic flat optical components via compensation between structure and material dispersions, Sci. Rep., vol. 6, Jan. 22, 2016, 7 pages.
Devlin et al., Broadband high-efficiency dielectric metasurfaces for the visible spectrum, Proceedings of the National Academy of Sciences, vol. 113, No. 38, Sep. 20, 2016, pp. 10473-10478.
Goldys et al., Analysis of the red optical emission in cubic GaN grown by molecular-beam epitaxy, Phys. Rev. B, vol. 60, No. 9, Aug. 15, 1999, pp. 5464-5469.
Ng et al., Light field photography with a hand-held plenoptic camera. Stanford University Computer Science Tech Report CSTR, Jan. 2005, 11 pages.
Khorasaninejad et al., Metalenses at visible wavelengths: Diffraction-limited focusing and subwavelength resolution imaging, Science, vol. 352, Issue 6260, Jun. 3, 2016, pp. 1190-1194.
Kamali et al., Angle-Multiplexed Metasurfaces: Encoding Independent Wavefronts in a Single Metasurface under Different Illumination Angles, Physical Review, vol. 7, Dec. 6, 2017, 9 pages.
Wang et al., A Broadband Achromatic Metalens in the Visible, Nature Nanotechnology, vol. 13, Mar. 2018, pp. 227-232.

* cited by examiner

BROADBAND ACHROMATIC METALENS IN THE VISIBLE SPECTRUM

CROSS REFERENCE OF RELATED APPLICATIONS

This non-provisional application claims priority to U.S. provisional patent application Ser. No. 62/610,432 filed on Dec. 26, 2017. This and all other extrinsic materials discussed herein are hereby incorporated by reference in their entirety.

BACKGROUND

Technical Field

This invention herein relates to full-color imaging and detection, complementary metal-oxide-semiconductor (CMOS) image sensor, spectroscopy, beam splitter, charge coupled device, lenses of phones or cameras.

Related Arts

Traditional optical lenses suffer from strong chromatic aberration, which degrades their performance in full-color imaging applications. In order to eliminate the chromatic effect, people have to integrate several lenses with opposite dispersion together. In addition, traditional optical components such as color filters, light focusing, and beam splitter can only provide one specific functionality from each individual component. One has to combine a couple of them for either eliminating the chromatic aberration or accomplishing multi-functionality. In addition to the combination of multi-components, the intrinsic optical properties of natural materials and the design principles of components for desired functionalities also make the final device be generally bulky. For example, the CMOS image sensor is composed of the color filters and microlenses on the photodiodes.

Recently, metamaterials or metasurfaces composed of sub-wavelength structures are found to be capable of tailoring light properties at a subwavelength resolution[1, 2], and hence effectively expands the range of the effective optical refractive index, making them promising for developing flat optical components[3-5]. To date, a number of applications based on metasurfaces have been demonstrated through proper design of metasurface unit elements, such as polarization generator[6-8], optical imaging encoding[9-11], tunable optical components[12-15] and retroreflector[16]. The great ability for super-resolution nanofabrication beyond the diffraction limit and surface plasmon focusing have also been performed based on plasmonic metasurfaces[17]. By producing a hyperbolical phase profile, metasurfaces can work as lenses (also refer to metalens) enable to converge incident light beam with considerable efficiency[18, 19]. Comparing to conventional bulky lenses, which rely on specifically polished surface profile on transparent optical materials to attain the required gradual phase change, metalens is capable of focusing incident light with a much compact dimension. The metalens with extremely high numerical aperture (NA) had also been demonstrated[20], validating their great performance for future applications. But the previously demonstrated metalenses still suffer from strong chromatic aberration. Some pioneering works suggested optimizing arrangements of unit elements of the metalens to realize an achromatic metalens either at certain discrete wavelengths[21-24] or in a narrow bandwidth of electromagnetic spectrum[25, 26]. However, these metalenses with limited achromatic property are not competent enough for full-colour imaging applications.

Very recently, a broadband achromatic metalenses has been successfully demonstrated by incorporating integrated-resonant unit element (IRUE) with Pancharatnam-Berry (P-B) phase method[27]. The required phase shift over the entire metalens surface are realized by carefully designing and arranging the IRUEs. As a proof-of-concept work, it was designed to operate in near infrared region with a reflection scheme. Although the reflective metalens is useful in some cases, transmission optical components are much more attractive and highly desirable for practical applications, especially for the ones working at visible region[28, 29].

SUMMARY

In this disclosure, a state-of-the-art demonstration of broadband achromatic metalenses working at visible light in a transmission version is presented. Lossless semiconductor material, gallium nitride (GaN) is utilized for constructing unit elements to access waveguide-like resonant modes at visible spectrum[18]. To introduce integrated-resonances for required phase compensation, both solid and inverse structures[30] are implemented as the building blocks. Full-colour imaging using achromatic and chromatic (which is designed via normal P-B phase based metasurfaces[31, 32]) metalenses are also performed, which further verifies that the proposed broadband achromatic metalenses are promising for full-colour optical techniques and applications.

To achieve the above objective, one embodiment of the invention discloses an optical component which comprises an array of metalenses. Each metalens comprises a plurality of nanostructures and a dielectric layer and the nanostructures are disposed on the dielectric layer, and the nanostructures comprises an array of first phase compensation structures, and an array of second phase compensation structures. The array of the first phase compensation structures are disposed to surround the array of the second phase compensation structures so as to define a single metalens. The first and second phase compensation structures are complementary to each other and substantially satisfy the Babinet's principle.

In one embodiment, each first phase compensation structure is a nanopillar, each second phase compensation structure is a nanopore.

In one embodiment, each metalens has a phase profile which satisfy the following equations (1) to (4):

$$\varphi_{AL}(r, \lambda) = -\left[\frac{2\pi}{\lambda}\left(\sqrt{r^2 + f^2} - f\right)\right] + \varphi_{shift}(\lambda) \tag{A}$$

$$\varphi_{shift}(\lambda) = \frac{a}{\lambda} + b \tag{B}$$

$$a = \delta\frac{\lambda_{min}\lambda_{max}}{\lambda_{max} - \lambda_{min}} \tag{C}$$

$$b = -\delta\frac{\lambda_{min}}{\lambda_{max} - \lambda_{min}} \tag{D}$$

where $\varphi_{AL}$ is a phase retardation of an arbitrary point on a surface of the metalens, r is a distance between said arbitrary point and a center on said surface of the metalens, λ is a working wavelength in free space, f is a designed focal length, $\lambda_{min}$ and $\lambda_{max}$ are the boundaries of an interest wavelength band, and δ is a largest additional phase shift between $\lambda_{min}$ and $\lambda_{max}$ at the center of the metalens.

In one embodiment, the first phase compensation structures have phase compensations ranging from 660 degree (°) to 1050 degree (°).

In one embodiment, each of the first nanopillars has a length ranging from 80 to 165 nm, a width ranging from 45 to 110 nm and a height of 800 nm.

In one embodiment, the second phase compensation structures have phase compensations ranging from 1080 degree (°) to 1140 degree (°).

In one embodiment, each of the nanopores has a length ranging from 125 to 163 nm, a width ranging from 50 to 80 nm, and a height of 800 nm.

In one embodiment, each first phase compensation structure and each second phase compensation structure are made of a transparent material with high refractive index which is selected from the group consisting of gallium nitride (GaN), gallium phosphide (GaP), aluminum arsenide (AlAs), aluminum gallium arsenide (AlGaAs), titanium dioxide ($TiO_2$), silicon (Si) and silicon nitride ($Si_3N_4$)

In one embodiment, the first and second phase compensation structures are in a periodic hexagonal lattice.

In one embodiment, the dielectric layer is made of a material which is selected from the group consisting of ITO, Al:ZnO (AZO), Ga:ZnO(GZO), $MgF_2$, $HfO_2$, $Si_3N_4$, $SiO_2$, and $Al_2O_3$.

In one embodiment, each metalens is transparent.

In one embodiment, focal lengths of all metalenses are the same.

In one embodiment, at least one of the metalenses has a focal length which is different from that of another metalens.

In one embodiment, wherein the array of the first phase compensation structures surrounds the array of the second phase compensation structures concentrically.

In this disclosure, the design and fabrication comprising GaN-based integrated-resonant unit elements (IRUEs) are shown to achieve an achromatic metalens operating in the entire visible region in transmission mode. The focal length of our metalenses remains unchanged as the incident wavelength is varied from 400 nm to 660 nm, demonstrating complete elimination of chromatic aberration in about 49% bandwidth from the central working wavelength. The average efficiency of a metalens with numerical aperture of 0.106 is about 40% over the whole visible spectrum. Accordingly, this invention utilizes metal/dielectric nanoantennas to possess broadband achromatic metalenses, which is capable of focusing light onto the same focal plane in a wide range of visible light. This invention can be applied to full-color imaging system, wide-band detection, wavelength-division multiplexing, focusing the light beam at arbitrary spatial positions with a pixel-level scale device. Moreover, the present invention also possesses the pixel-level color router, which is capable of guiding individual primary wavelengths into different spatial positions, and a functionality of selectively specific narrow bandwidth for light routing, and therefore has a function of multiplex color routing.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The embodiments will become more fully understood from the detailed description and accompanying drawings, which are given for illustration only, and thus are not limitative of the present invention, and wherein:

In FIG. 2A, the phase compensation is 1050° and in FIG. 2B the phase compensation is 1080°. Insets shown in FIGS. 2A and 2B illustrate the solid and inverse nanostructures, respectively.

In FIG. 7, $\lambda/4$ and $\lambda/2$ mean the quarter-wave plate and half-wave plate, respectively, SC laser means the supercontinuum laser, and AOTF means the acousto-optic filter.

In FIG. 10, $\lambda/4$ and $\lambda/2$ mean the quarter-wave plate and half-wave plate, respectively.

DETAILED DESCRIPTION OF THE INVENTION

Figure 1A:
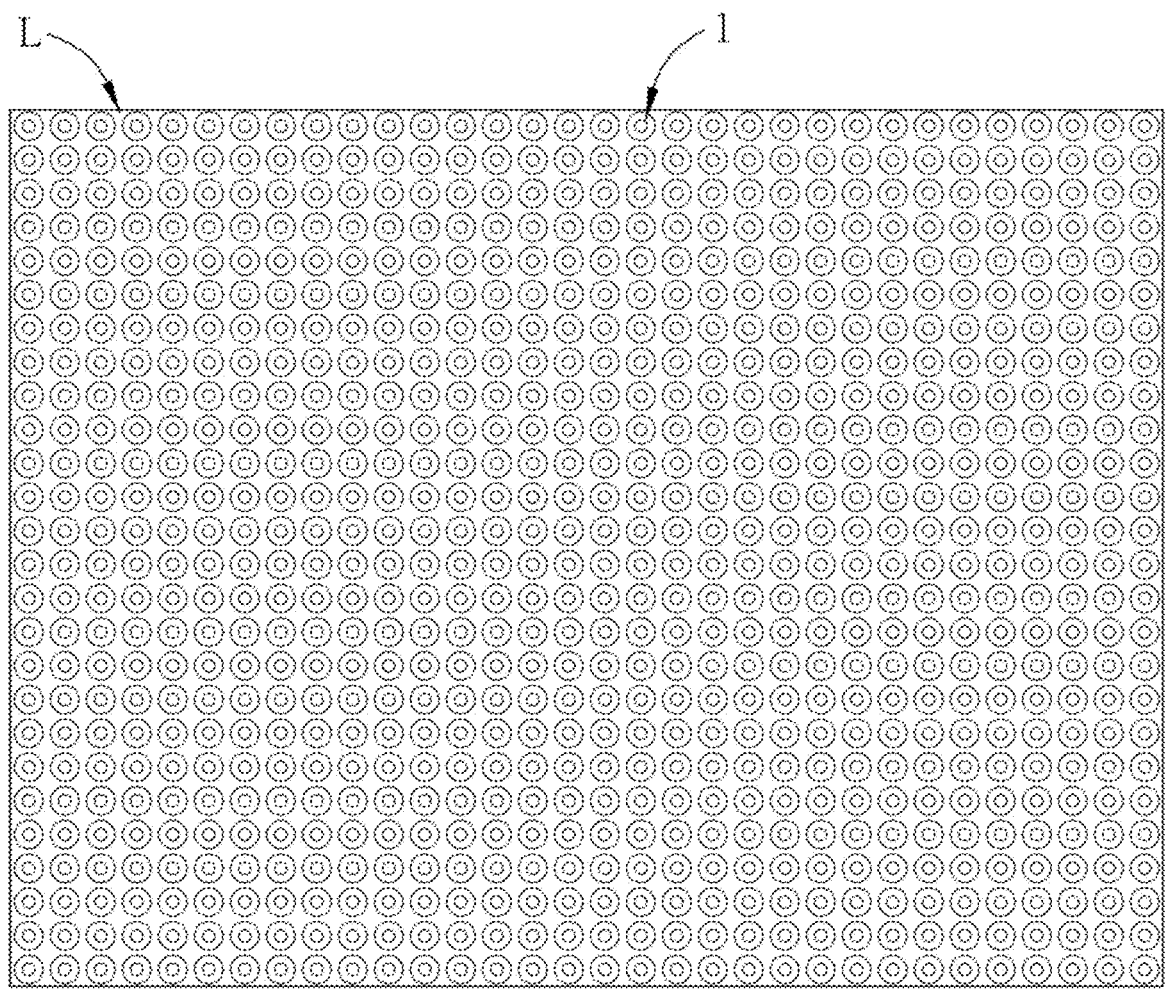
FIG. 1A is a schematic view of the optical component according to one embodiment of this disclosure.

The embodiments of the invention will be apparent from the following detailed description, which proceeds with reference to the accompanying drawings, wherein the same references relate to the same elements. Specific structures and function details disclosed herein are only for the illustrative purpose for describing the exemplary embodiment of this disclosure. However, this disclosure can be specifically implemented through many replacements, and should not be explained as being restricted to only the embodiment disclosed herein. Moreover, all publications mentioned or cited in this disclosure are incorporated by reference to the same extent as if each individual publication or patent specification were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In the description of this disclosure, it is to be understood that the terms "center", "transversal", "up", "down", "left", "right", "vertical", "horizontal", "top", "bottom", "inside" and "outside" indicating the orientation or position relationships are the orientation or position relationships based on the drawing, are only provided for the purposes of describing this disclosure and simplifying the description, but do not indicate or imply that the directed devices or elements must have the specific orientations or be constructed and operated in the specific orientations, and thus cannot be understood as the restriction to this disclosure. In addition, the terms "first", and "second" are used for the illustrative purpose only and cannot be understood as indicating or implying the relative importance or implicitly specifying the number of indicated technical features. Therefore, the features restricted by "first" and "second" may expressly or implicitly comprise one or multiple ones of the features. In the description of this disclosure, unless otherwise described, the meaning of "multiple" comprises two or more than two. In addition, the terms "comprises" and any modification thereof intend to cover the non-exclusive inclusions.

In the description of this disclosure, it needs to be described that, unless otherwise expressly stated and limited, the terms "mount", "link" and/or "connect" should be construed broadly. For example, they may be referred to a fixed connection, detachable connection or connecting integrally, or they may be referred to a mechanical or an electrical connection; or, they may be referred to a direct connection or an indirect connection through an intermediate medium or an inter-communication between two elements. It will be apparent to those skilled in the art that the specific meanings of the above terms in this application may be understood according to the specific conditions.

The terms used herein are for the purpose of describing only specific embodiments and are not intended to limit the exemplary embodiments. Unless the contexts clearly indicate otherwise, the singular form "one", "a" and "an" used here further intend to include plural forms. It should also be understood that the terms "comprising" and/or "including" are used herein to describe the features to describe the presence of stated features, integers, steps, operations, units and/or elements without excluding the presence or addition of one or more other features, integers, steps, operations, units, elements, and/or combinations thereof.

The optical component, according to various embodiment provided by this disclosure, will be described with reference to FIGS. 1A through 10.

Figure 1B:
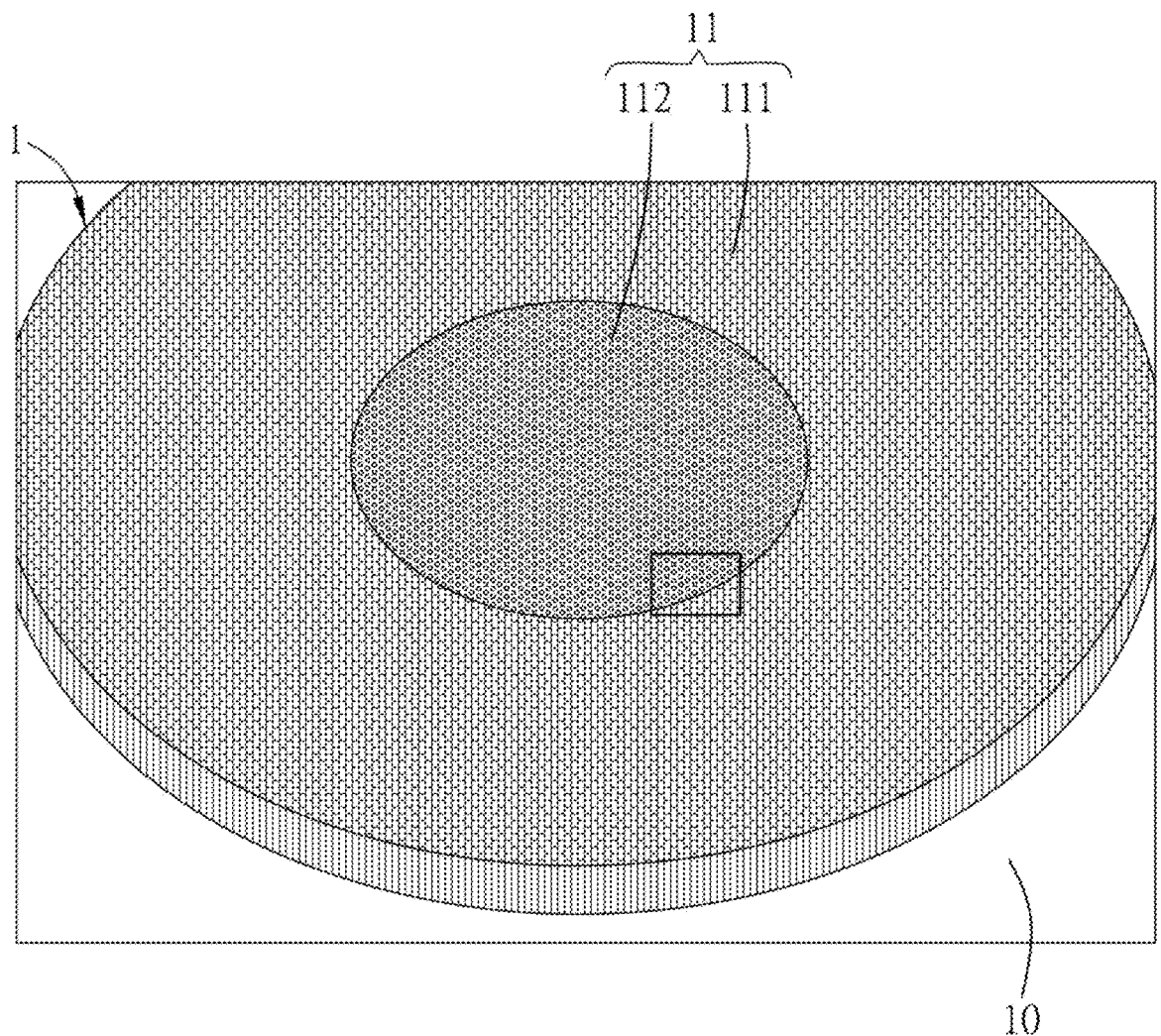
FIG. 1B is the schematic view of the metalens of the optical component shown in FIG. 1A.
Figure 1C:
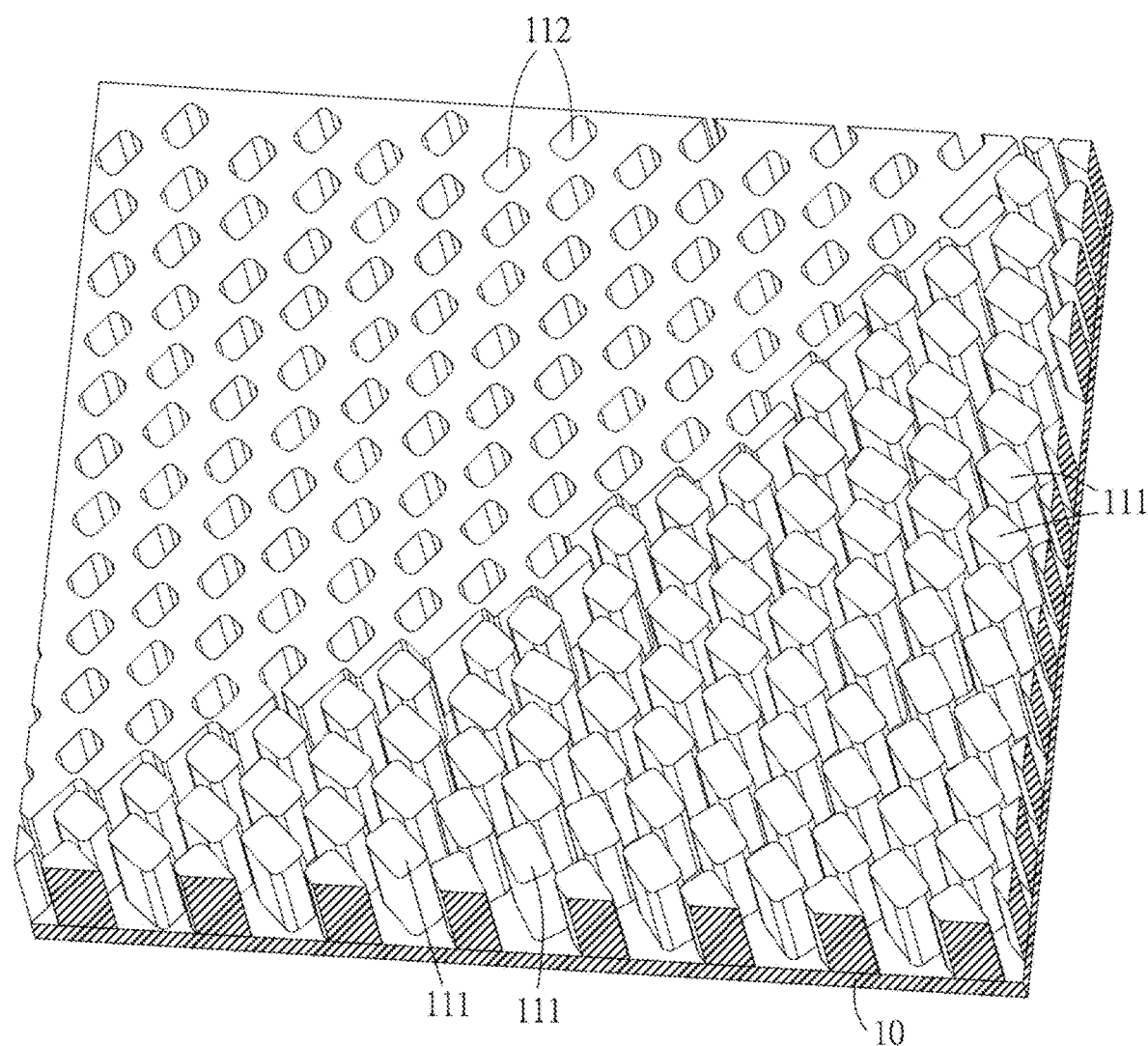
FIG. 1C depicts an enlarged tilted view of the down-right square section on the metalens 1 shown in FIG. 1B.

Please refer to FIGS. 1A to 1E, the optical component L according to one embodiment of this disclosure comprises an array of metalenses 1. FIG. 1A is a schematic view of the optical component L according to the present embodiment. As shown in FIG. 1B, each metalens 1 comprises a plurality of nanostructures 11 and a dielectric layer 10. The nanostructures 11 are all disposed on the dielectric layer 10. The nanostructures 11 comprises an array of first phase compensation structures 111 and an array of second phase compensation structures 112. FIG. 1B is the schematic view of the metalens 1 of the optical component L shown in FIG. 1A. FIG. 1C depicts an enlarged tilted view of the down-right square section on the metalens 1 shown in FIG. 1B. The optical component L can be transmission type or reflection type. When the optical component L is transmission type (i.e., each metalens is transparent to the incident light, which is not necessarily, but preferred, visible), each first phase compensation structure 111 and each second phase compensation structure 112 can made of a transparent material with high refractive index, such as gallium nitride (GaN), gallium phosphide (GaP), aluminum arsenide (AlAs), aluminum gallium arsenide (AlGaAs), titanium dioxide (TiO$_2$), silicon (Si), or silicon nitride (Si$_3$N$_4$), etc[20]. Also, the dielectric layer can be made of a material such as ITO, Al:ZnO (AZO), Ga:ZnO (GZO), MgF$_2$, HfO$_2$, Si$_3$N$_4$, SiO$_2$ or Al$_2$O$_3$[40]. When the optical component L is reflection type, the first and second phase compensation structures can be made of metals, such as aluminum, silver, gold, copper, rhodium, etc. Alternatively, the first and second phase compensation structures 111 and 112 can be made of semi-conductive materials, such as GaN, GaP, AlAs and AlGaAs, and coated with metals, so as to make the optical component L to be reflection type. Or, a metal layer can be disposed at the bottom side (i.e. the opposing side with respect to where the nanostructures 11 disposed) of the dielectric layer 10, when the nanostructures 11 are made of those transparent materials instead of metals, so as to make the optical component L to be reflection type.

As shown in FIGS. 1B and 1C, the array of the first phase compensation structures 111 are disposed to surround the array of the second phase compensation structures 112 so as to define a single metalens. Preferably, the array of the first phase compensation structures 111 may surround the array of the second phase compensation structures 112 concentrically. The first and second phase compensation structures 111, 112 are complementary to each other and substantially satisfy the Babinet's principle. Each of the first phase compensation structures 111 can be a nanopillar while each of the second phase compensation structures 112 is a nanopore. The size and shape of each nanopore are substantially equal to the sizes and shapes of the nanopillars. In addition, the array of the second phase compensation structures 112 have bodies that are void where the array of the first phase compensation structures 111 are solid, and solid where the array of the first phase compensation structures 111 are void. The sum of the radiation patterns caused by the first and second phase compensation structures 111 and 112 must be the same as the radiation pattern of the unobstructed beam, and the radiation patterns caused by the first and second phase compensation structures 111 and 112 are opposite in phase, but equal in amplitude. In such conformation, the diffraction patterns from the first phase compensation structures 111 (i.e. nanopillars) and the second phase compensation structures 112 (i.e. nanopores) are substantially identical, which satisfies the Babinet's principle.

In addition, for improving the imaging properties of the optical component L, each metalens 1 preferably has a phase profile which satisfy the following equations (A) to (D):

$$\varphi_{AL}(r, \lambda) = -\left[\frac{2\pi}{\lambda}\left(\sqrt{r^2 + f^2} - f\right)\right] + \varphi_{shift}(\lambda) \quad (A)$$

$$\varphi_{shift}(\lambda) = \frac{a}{\lambda} + b \quad (B)$$

$$a = \delta \frac{\lambda_{min}\lambda_{max}}{\lambda_{max} - \lambda_{min}} \quad (C)$$

$$b = -\delta \frac{\lambda_{min}}{\lambda_{max} - \lambda_{min}} \quad (D)$$

where $\varphi_{AL}$ is a phase retardation/phase compensation value (°) of an arbitrary position on the metalens, r is a distance from said arbitrary position to the center of the metalens. $\lambda$ is a working wavelength (nm) in free space (i.e. in vacuum), and f is a designed focal length (μm). $\lambda_{min}$ and $\lambda_{max}$ (both in nm) are the boundaries of the interest wavelength band and $\lambda \in \{\lambda_{min}, \lambda_{max}\}$. $\delta$ is the largest additional phase shift between $\lambda_{min}$ and $\lambda_{max}$ at the center of the metalens. In Eq. (A), the first part $$-\left[\frac{2\pi}{\lambda}\left(\sqrt{r^2 + f^2} - f\right)\right]$$

is to make the incident planar wave of the metalens 1 (which is also planar), after transmitted through the metalens 1 with such designed phase profile (or phase distribution profile), to become a spherical wave converged at the distance (i.e. the focal length) f and without spherical aberration. By introducing the second part, $\varphi_{shift}(\lambda)$, in Eq. (A), the phase difference between the maximum and the minimum wavelengths within the working bandwidth (defined as phase compensation, which is a function of spatial position at metalens surface) is consequently compensated by the integrated-resonances, and the conformation of the second phase compensation structures 112 (which are inverse conformations with respect to the solid conformations of the first phase compensation structures 111) play the dominate role at the central part of the metalens 1 to make the metalens 1, with such designed phase profile, have the achromatic property.

Figure 1D:
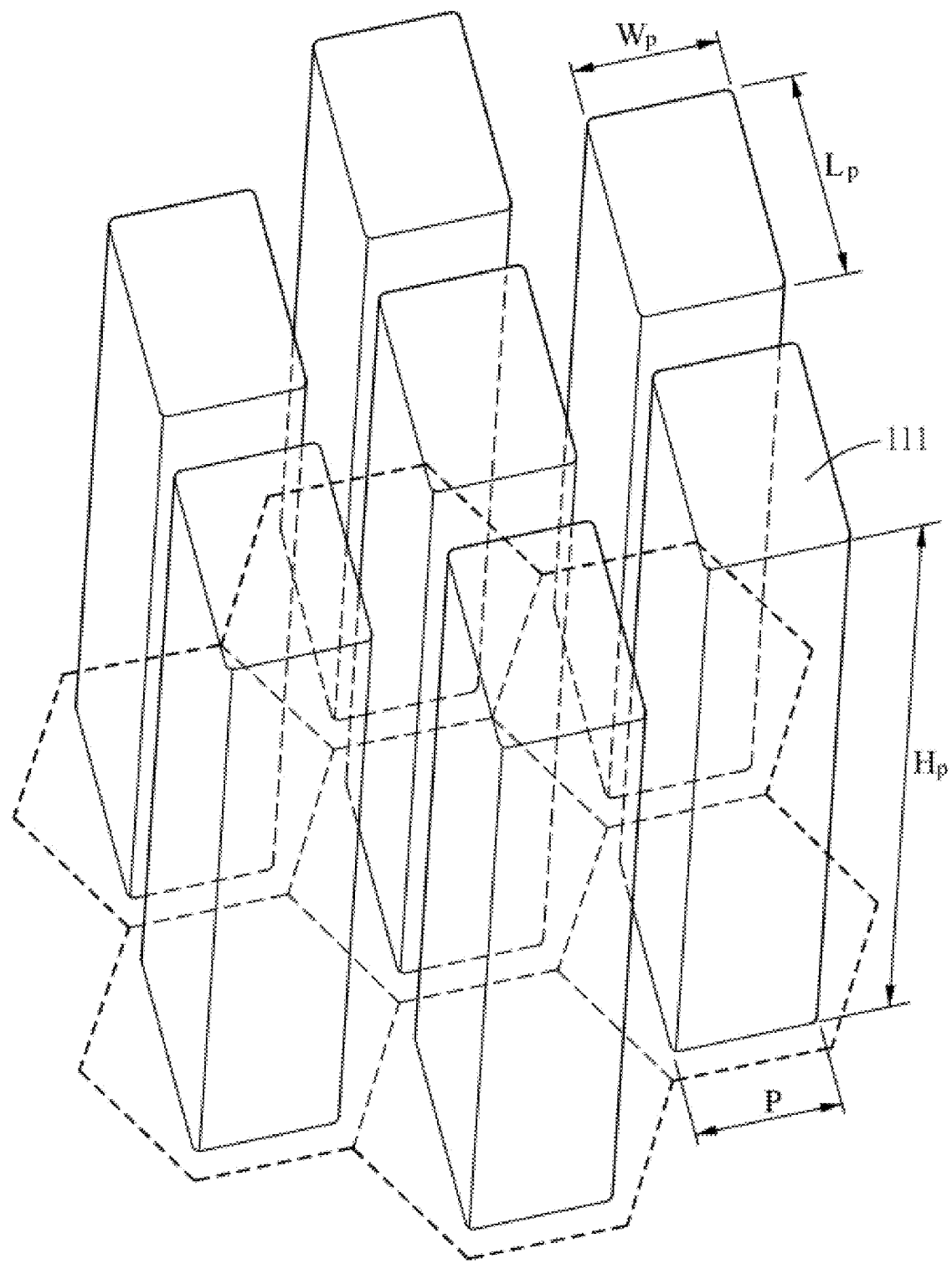
FIG. 1D is a schematic view of the first phase compensation structures (nanopillars) of the metalens shown in FIG. 1B arranged in a periodic hexagonal lattice.
Figure 1E:
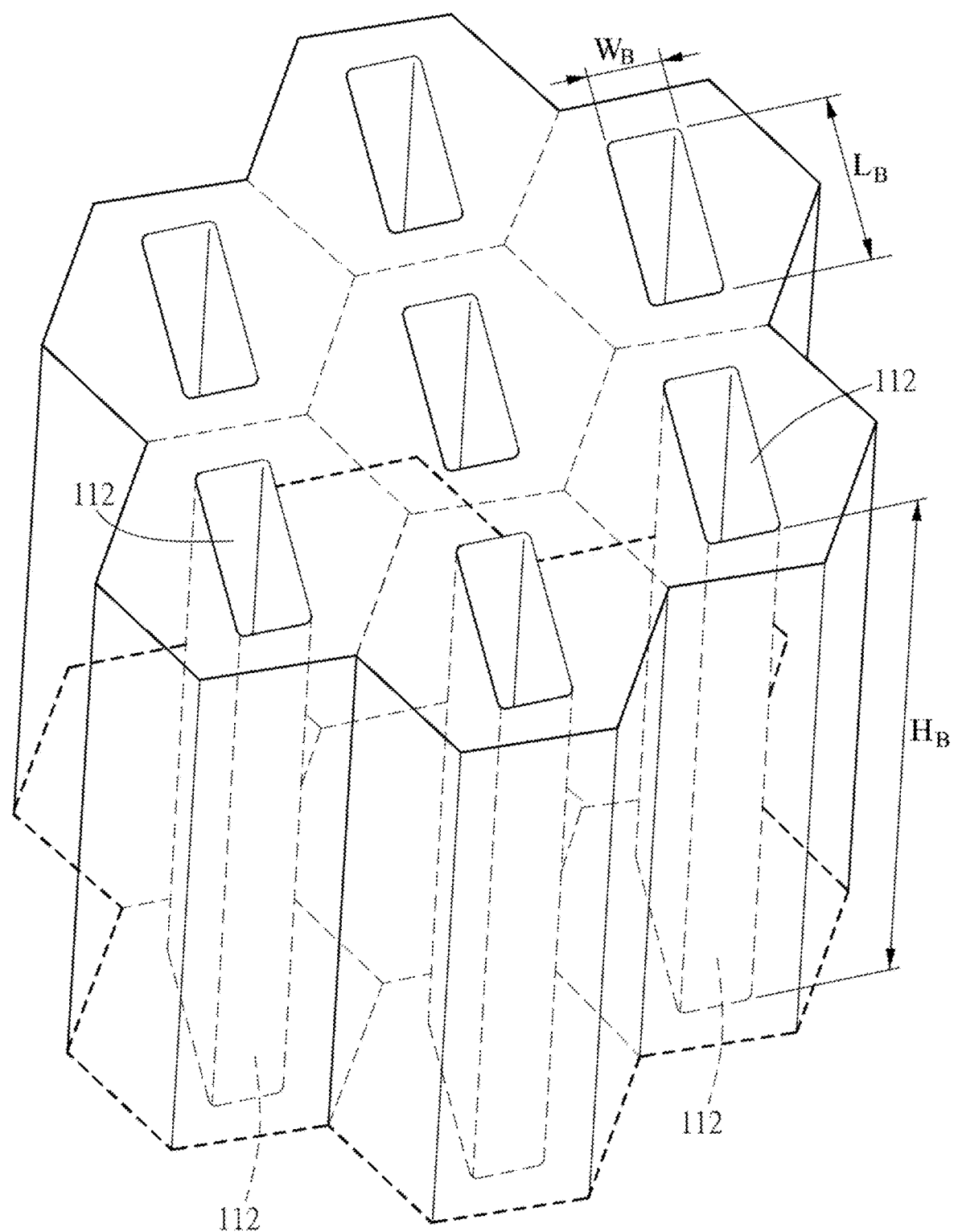
FIG. 1E is a schematic view of the second phase compensation structures (nanopores) shown in FIG. 1B arranged in a periodic hexagonal lattice.

Please further refer to FIGS. 1D and 1E, both the first and second phase compensation structures 111 and 112 are in a periodic hexagonal lattice. The dashed lines around each hexagons are only for illustration, which do not represent any real physical boundaries existing on the dielectric layer 10. For such hexagonal lattice conformation, the first and second phase compensation structures 111 and 112 may occupy the physical space as compact as possible. In other words, more compactness of the first and second phase compensation structures 111 and 112 is, less non-working space of the metalens 1 is, and the better optical properties such metalens 1 may possess. Actually, the first and second phase compensation structures 111 and 112 may be arranged in a periodic lattice of any suitable regular polygon, such as triangle, square, pentagon, heptagon, octagon, etc. Based on such phase profile discussed in the preceding paragraph and for realizing the metalens 1 with NA=1.06, and f=235 μm which working in a bandwidth of the visible light, the first phase compensation structures 111 (i.e. nanopillar shown in FIG. 1D) may have phase compensations ranging from 660 degree (°) to 1050 degree (°) and each of these nanopillars may have a length $L_p$ ranging from 80 to 165 nm, a width $W_p$ ranging from 45 to 110 nm and a height $H_p$ of 800 nm. Also, the second phase compensation structures 112 (i.e. the nanopore shown in FIG. 1E) have phase compensations ranging from 1080 degree (°) to 1140 degree (°), and each of the nanopores may have a length $L_B$ ranging from 125 to 163 nm, a width $W_B$ ranging from 50 to 80 nm, and a height $H_B$ of 800 nm. The lattice constant P of the hexagon can be 120 nm. The detailed discussion will be provided with the following experimental examples.

Moreover, although in the optical component L according the previous embodiment all the metalenses 1 have the same focal length, these metalenses 1 may not be necessarily identical to each other, and that they may still have various focal lengths according to various practical needs. In other words, in the same optical component L, at least one of the metalenses 1 may have different focal length different from other metalenses 1. The size, conformation, suitable materials, variation or connection relationship to other elements of each detail elements of the optical component L can refer to the previous embodiments, and they are not repeated here.

To illustrate the functions and characteristics of the optical component L provided by the aforementioned embodiments, there are several experimental examples shown below.

Experimental Example 1

Fabrication Processes and Parameters of the Achromatic Metalenses

The growth of un-doped GaN on a double-polished sapphire is prepared by metal-organic chemical vapor deposition (MOCVD). Prior to the growth, the double-polished sapphire substrate is thermally baked at 1100° C. in hydrogen gas to remove surface contamination and desorb native oxide on the substrate. After that, an 800-nm-thick un-doped GaN layer is grown on the substrate. Trimethylgallium (TMGa) and ammonia ($NH_3$) are used as Ga and N precursors, while high purity hydrogen ($H_2$) is used as the carrier gas.

To fabricate GaN-based IRUEs with high-aspect ratio, a $SiO_2$ layer with the thickness of 400 nm is deposited by using plasma-enhanced chemical vapor deposition (PECVD) as a hard mask layer. Subsequently, a 100-nm-thick ZEP-520A e-beam resist layer is spin-coating on it. The sample is then exposed through electron-beam lithography (EBL) with 100-kV acceleration voltage with a beam current of 100 pA to define the features of each structure. The patterns are revealed after the development process in ZEP-N50. Next, we use an electron-gun evaporator equipment to deposit a 40-nm-thick Cr layer as a hard etching mask. The lift-off process of the sample is done in a solution of N,N-Dimethylacetamide (ZDMAC). After removal of the resist, the patterns are transferred to the 400-nm-thick $SiO_2$ hard mask layer by reactive ion etching (RIE) operated at the plasma power of 90 W. Afterwards, the sample with the patterned $SiO_2$ hard mask layer is etched by the inductively-coupled-plasma reactive ion etching (ICP-RIE) system at RF frequency of 13.56 MHZ with an ICP source power of 700 W and a bias power of 280 W, using $BCl_3/Cl_2$ chemistry. The final sample can be obtained after the removal of the patterned $SiO_2$ hard mask with buffered oxide etch (BOE) solution.

Experimental Example 2

Integrated-Resonant Unit Elements with GaN Nanopillars

Figure 2B:
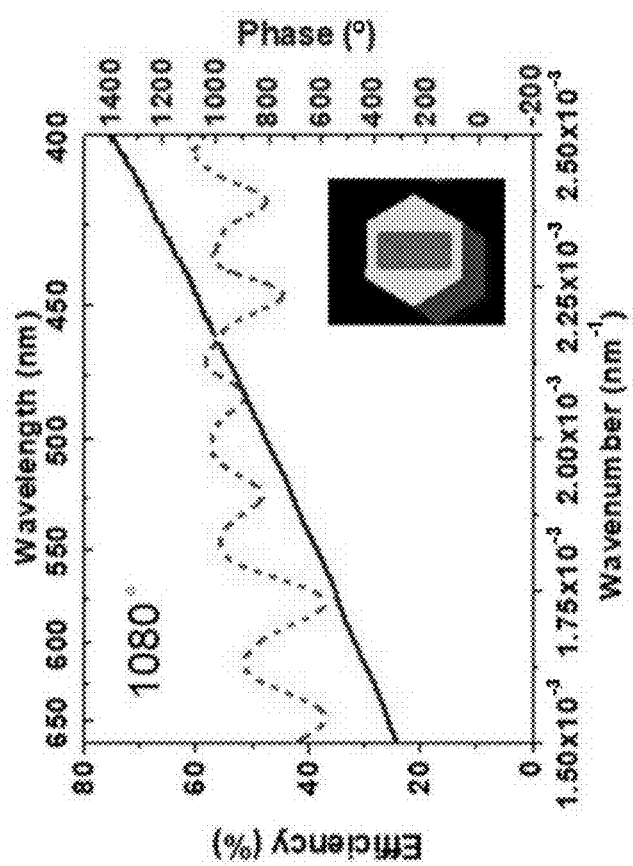
FIGS. 2A and 2B demonstrate the circularly-polarized conversion efficiencies (dashed curves) and phase profiles (solid curve) for integrated-resonant unit elements (IRUEs) for broadband achromatic metalens at visible light.
Figure 2A:
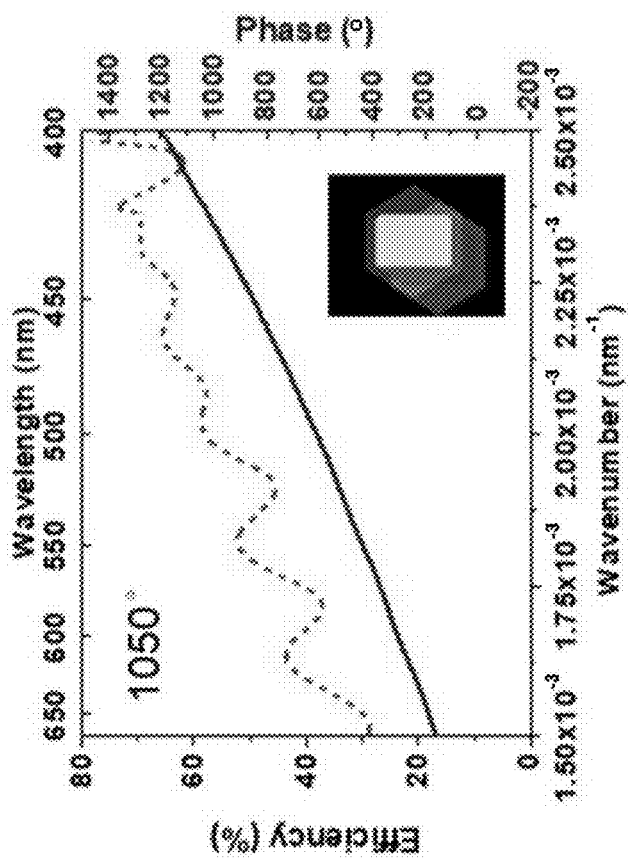
Figure 2C:
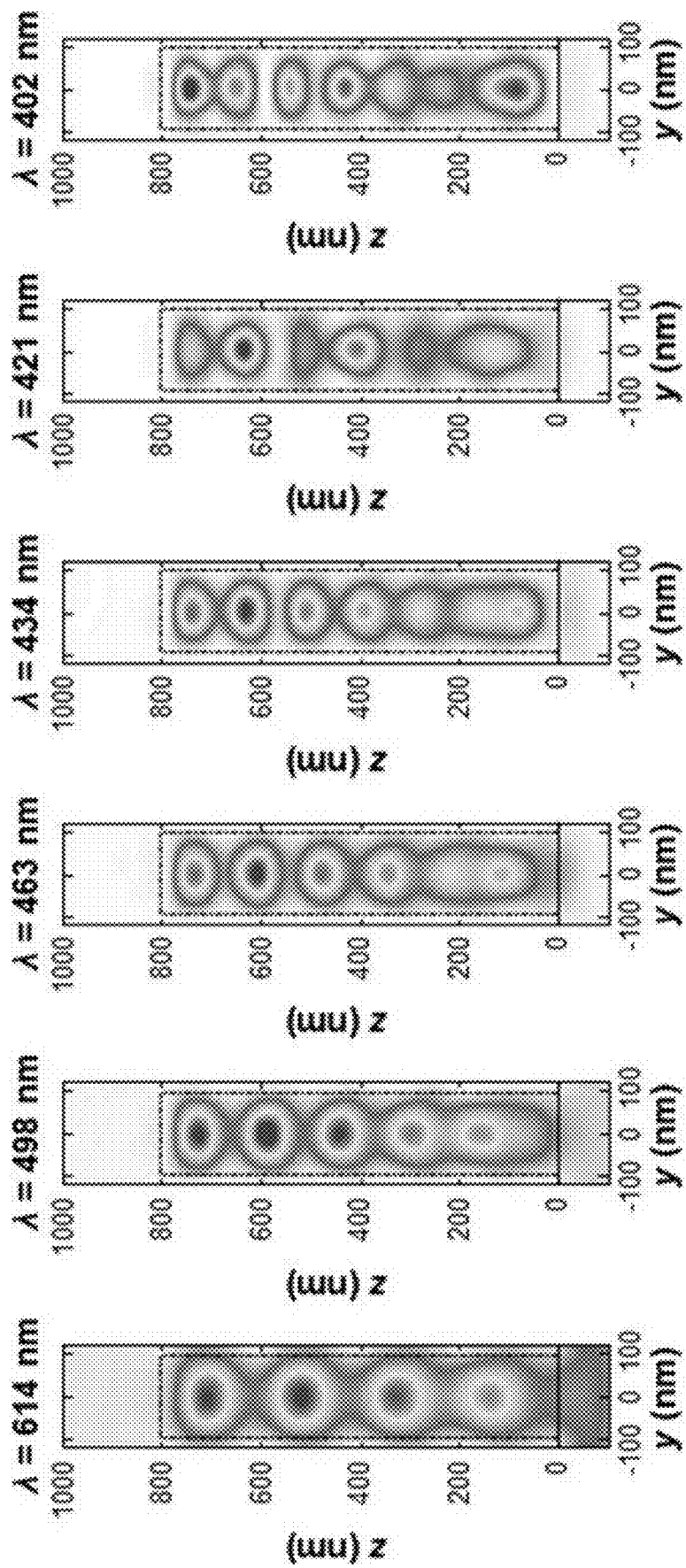
FIGS. 2C and 2D demonstrate the normalized magnetic energy for the case of phase compensation of 1050° and 1080° at different incident wavelengths, respectively. The black dashed line indicates the boundary of GaN structures. The thickness of all GaN nanopillars is fixed at 800 nm, standing on an $Al_2O_3$ substrate.
Figure 2D:
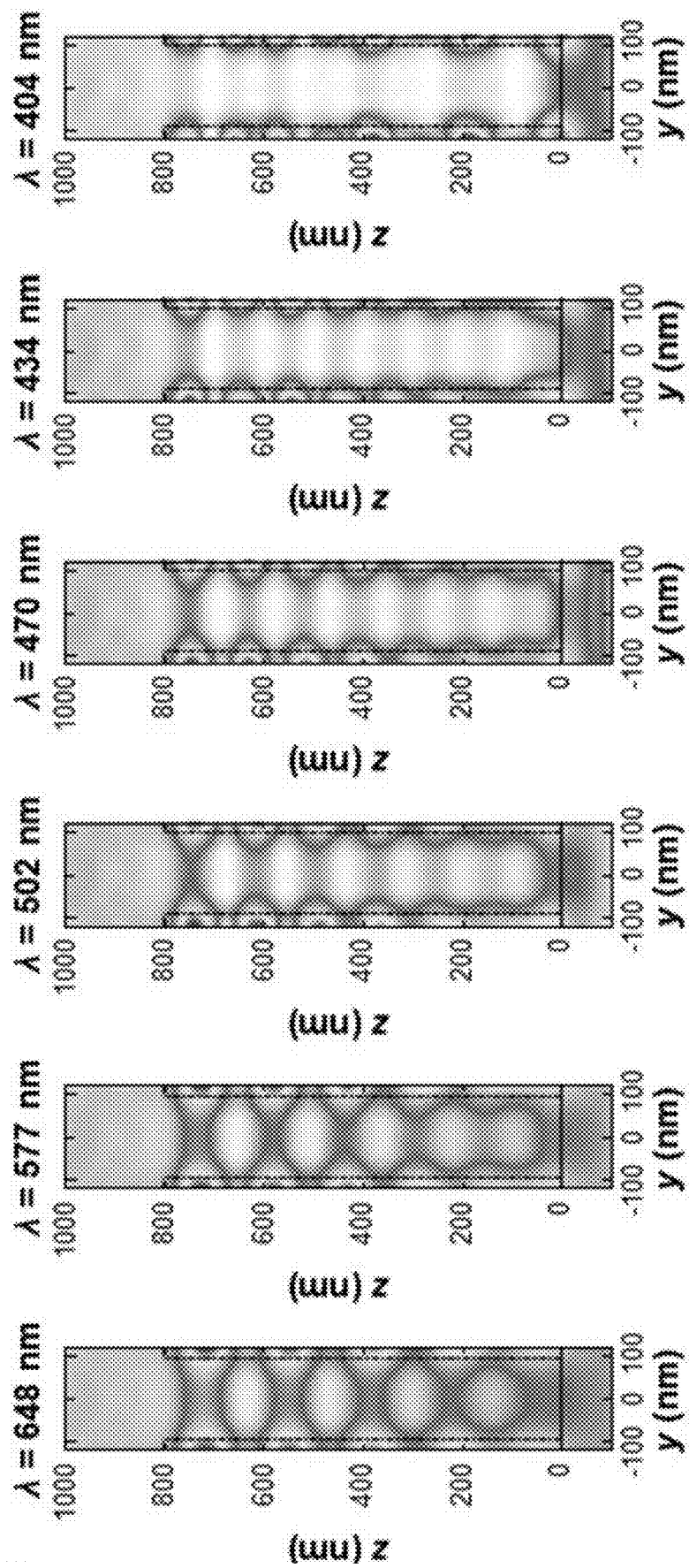

In principle, full-colour image without aberration effect can only be reconstructed through a perfect achromatic lens, which is able to converge light at any wavelength within the working range into the same focal plane. The building blocks of the achromatic metalens of this experimental example are composed of solid (inset in FIG. 2A, also refer to nanopillars) and inverse (inset in FIG. 2B) GaN nano-structures. To satisfy the phase requirement of achromatic metalenses, this work employs a couple of resonant modes in the IRUEs (integrated-resonant unit elements). These IRUEs are carefully arranged and rotated on the metalens surface and consequently able to exactly provide the required phase compensation and basic phase corresponding to their spatial positions[27]. For the cases of plasmonic systems, the IRUEs are formed by a couple of special placed nanorods, with near-field coupling among the nanostructures. Larger phase compensation can be directly realized through adding more resonators into the unit cells. Contrarily, the optical coupling among the dielectric nanopillars is weak because of their high refractive index related to the surrounding environment[33, 34]. Moreover, the waveguide-like cavity resonances in nanopillars exhibit that the induced optical fields are highly concentrated inside the dielectric structures, resulting in the negligible interaction with their neighbors[34]. Instead of introducing more resonators, one can also acquire large phase compensation with GaN nanopillars by exciting higher orders of waveguide-like cavity resonances, which can be realized by directly increasing the height of the nanopillars. FIGS. 2C and 2D show the right-hand circular polarization to left-hand circular polarization (RCP-to-LCP) conversion efficiency (dashed curves in FIGS. 2A and 2B) and phase profile (solid curves in FIGS. 2A and 2B) for phase compensation of 1050° (FIG. 2C) and 1080° (FIG. 2D). Details of all GaN IRUEs can be found in the following Table 1 and Table 2. The ripples are resulted from the excitation of multi-resonances inside the GaN nanopillars, which can be verified by checking the near-field distribution, as shown in FIGS. 2C and 2D. The chosen wavelengths correspond to the efficiency peaks/dips indicating the waveguide-like cavity resonances supported either in the GaN nanopillar (solid cases) or the GaN surrounding (inverse cases).

TABLE 1

Feature sizes of solid GaN nanopillars for phase compensation less than 1050°

| $L_p$ (nm) | $W_p$ (nm) | Phase compensation (°) |
|---|---|---|
| 80 | 45 | 660 |
| 95 | 50 | 690 |
| 115 | 50 | 720 |
| 125 | 55 | 750 |
| 130 | 60 | 780 |
| 135 | 65 | 810 |
| 135 | 70 | 840 |
| 140 | 75 | 870 |
| 140 | 80 | 900 |
| 145 | 85 | 930 |
| 150 | 90 | 960 |
| 155 | 95 | 990 |
| 165 | 100 | 1020 |
| 165 | 110 | 1050 |

TABLE 2

Feature sizes of inverse GaN structures for phase compensation greater than 1050°

| $L_B$ (nm) | $W_B$ (nm) | Phase compensation (°) |
|---|---|---|
| 163 | 80 | 1080 |
| 140 | 60 | 1110 |
| 125 | 50 | 1140 |

Experimental Example 3

Characteristics of Broadband Achromatic Metalenses at Visible Light

In brief discussing the design principle of the broadband achromatic metalens, which has been previously reported[27], it can be started with the phase profile of general metalenses incorporated with an additional phase shift. The phase profile of the achromatic metalenses, $\varphi_{AL}$ can be described as Eq. (1)[22, 27, 35, 36]:

$$\varphi_{AL}(r, \lambda) = -\left[\frac{2\pi}{\lambda}\left(\sqrt{r^2 + f^2} - f\right)\right] + \varphi_{shift}(\lambda) \quad (1)$$

where $r=\sqrt{x^2+y^2}$ is the distance between an arbitrary point and the center on the achromatic metalens surface (assuming the surface of metalens located at z=0 plane). $\lambda$ and f is the working wavelength in free space and the designed focal length, respectively. The additional phase shift exhibits an inversely linear relationship with the wavelength $\lambda$, that is $$\varphi_{shift}(\lambda) = \frac{a}{\lambda} + b,$$

with $$a = \delta \frac{\lambda_{min}\lambda_{max}}{\lambda_{max} - \lambda_{min}} \text{ and } b = -\delta \frac{\lambda_{min}}{\lambda_{max} - \lambda_{min}}.$$

The $\delta$ denotes the largest additional phase shift while $\lambda_{min}$ and $\lambda_{max}$ are the boundaries of the interest wavelength band. To satisfy the phase requirement as described in Eq. (1), we divide it into two parts, $$\varphi_{AL}(r,\lambda) = \varphi_L(r,\lambda_{max}) + \Delta\varphi'(r,\lambda) \quad (2)$$

where $$\varphi_L(r, \lambda_{max}) = -\left[\frac{2\pi}{\lambda_{max}}(\sqrt{r^2 + f^2} - f)\right] \text{ and}$$

$$\Delta\varphi'(r, \lambda) = -[2\pi(\sqrt{r^2 + f^2} - f)]\left(\frac{1}{\lambda} - \frac{1}{\lambda_{max}}\right) + \varphi_{shift}(\lambda).$$

Figure 3C:
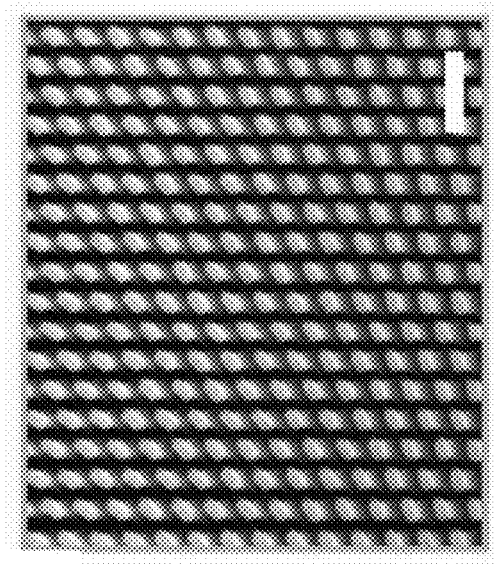
FIG. 3C is a zoom-in scanning electron microscope (SEM) images at the dashed square in the down-right region in FIG. 3A, which demonstrates the region of nanopillars in a tilted view. Scale bars: 500 nm.
Figure 3B:
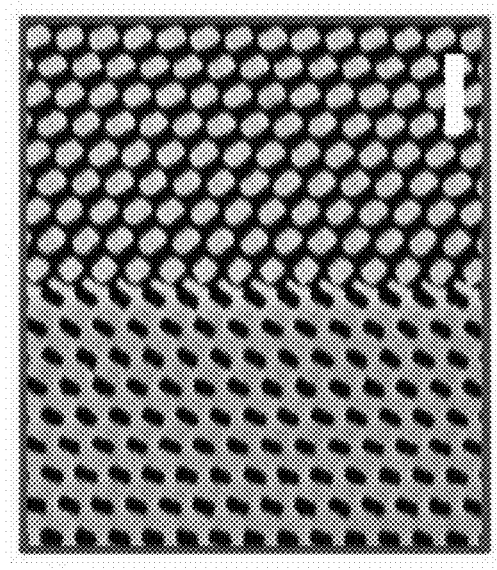
FIG. 3B is a zoom-in scanning electron microscope (SEM) images at the dashed square in the middle-right region in FIG. 3A, which demonstrates the boundary of nanopillars (right panel) and Babinet structures (left panel) in a top view. Scale bars: 500 nm.
Figure 3A:
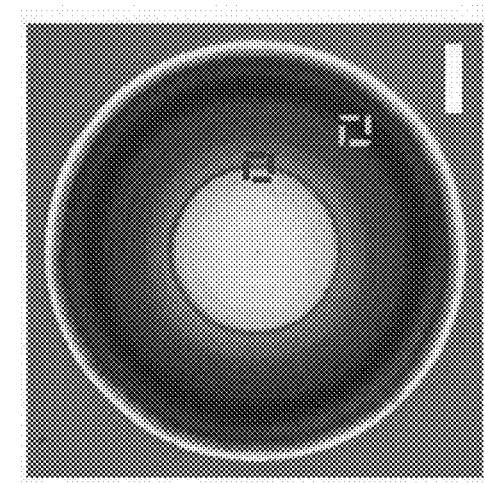
FIG. 3A is an optical image of the fabricated achromatic metalens with NA=0.106. Scale bar: 10 μm.

The first term in Eq. (2) is dispersionless, and the second term is wavelength-dependent[29]. The former one is obtained using P-B phase method, while the latter one can be realized through IRUEs. The phase difference between the maximum and the minimum wavelengths within the working bandwidth (defined as phase compensation, which is also a function of spatial position at metalens surface) is consequently compensated by the integrated-resonances. FIG. 3A shows the optical microscopic image of the achromatic metalens sample with NA being 0.106. Because of the introduction of $\varphi_{shift}$, the inverse GaN structures (which is able to offer larger phase compensation, see the aforementioned Table 1 and Table 2) play the dominate role at the central part of achromatic metalenses. Details about the fabrication parameters can be found in the following experimental example. FIGS. 3B and 3C present the scanning electron microscope (SEM) images from the fabricated sample. From such images, it can be observed that both solid and inverse GaN-based IRUEs are well-defined, showing the precise fabrication technique with several hard mask transfer and etching processes. It is worth mentioning that the approach based on this disclosure, comparing with specific top-down lithography approach with atomic layer deposition (ALD) technique for visible metalenses[37], has significant advantages of low-cost and semiconductor foundry compatible process, which definitely would benefit the development for flat optical systems in real life.

Figure 3D:
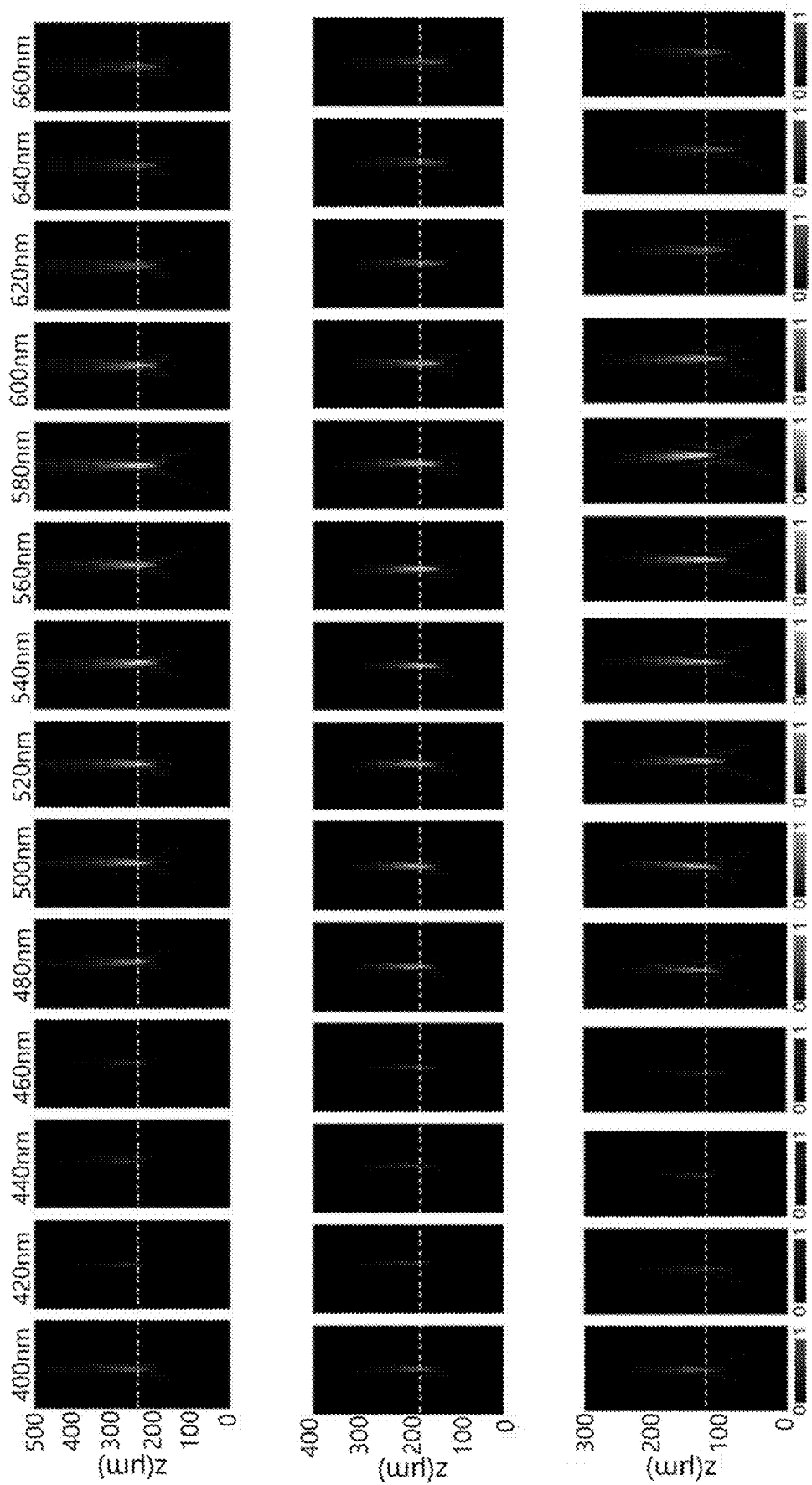
FIG. 3D demonstrates the experimental verification of broadband achromatic metalenses with different NAs. Measured light profile of broadband achromatic metalenses with NA of 0.106 (upper panels), 0.125 (middle panels), and 0.15 (lower panels).
Figure 7:
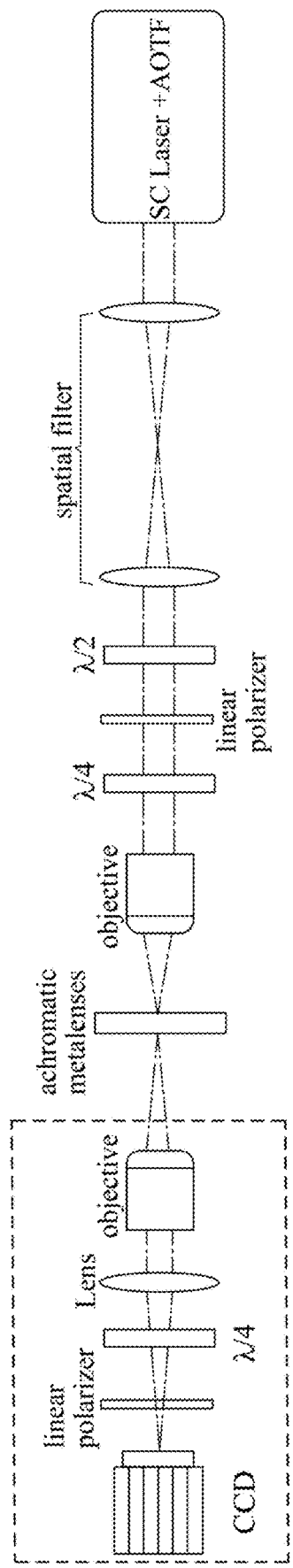
FIG. 7: Optical setup for experimentally verifying the performance of fabricated broadband achromatic metalenses. The incident wavelength is selected with the AOTF. Then laser beam with a circular polarization state is generated using a linear polarizer and a quarter-wave plate. An objective (20× magnification, NA=0.4) is used to focus the incident circularly polarized light onto the achromatic metalens and another objective (50× magnification, NA=0.42) is used to collected the focused spot from the achromatic metalenses in transmission.
Figure 8:
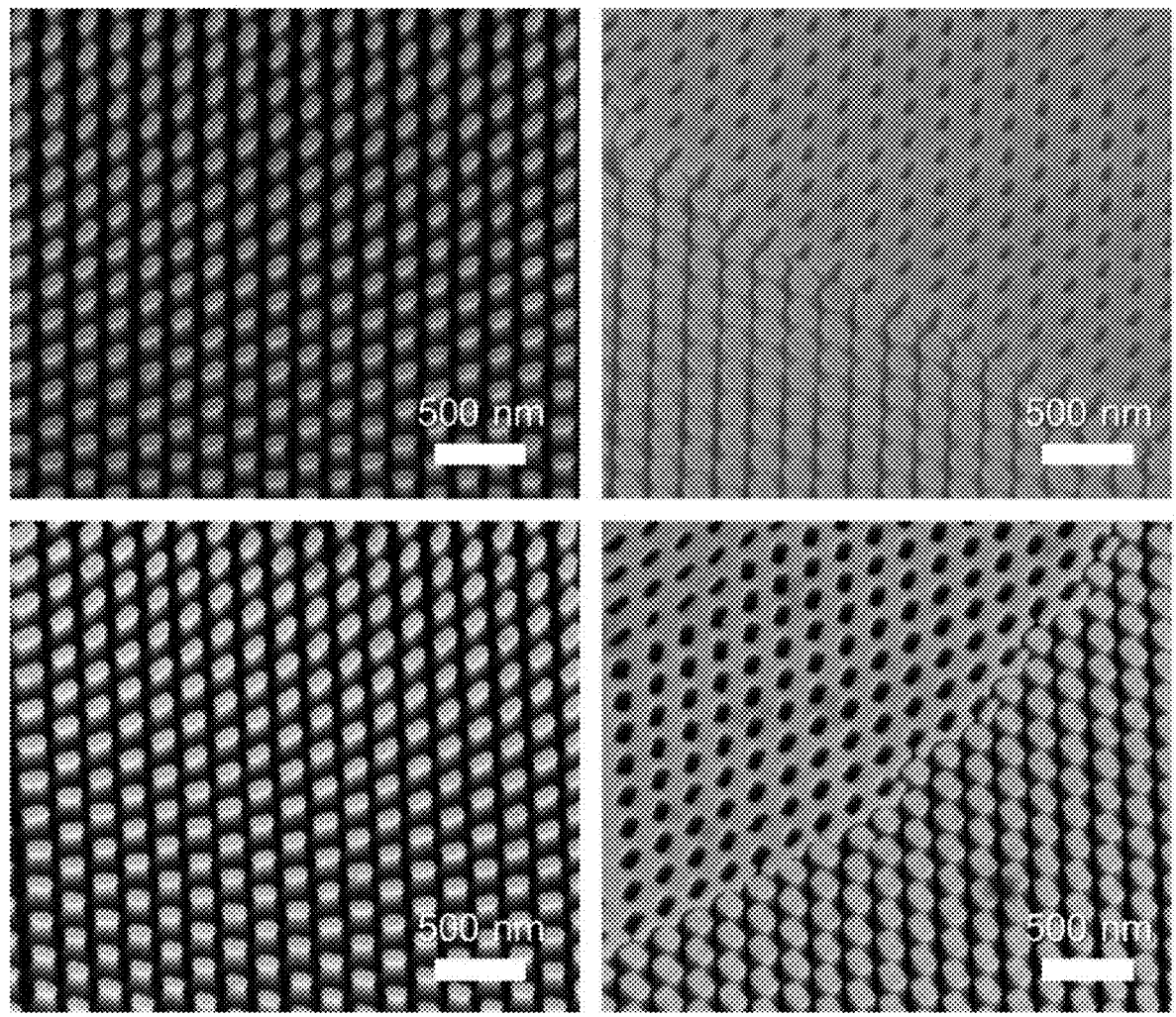
FIG. 8: SEM images of broadband achromatic metalenses. Images of achromatic metalenses with NA of 0.125 (the upper two panels), and 0.15 (the lower two panels).
Figure 9:
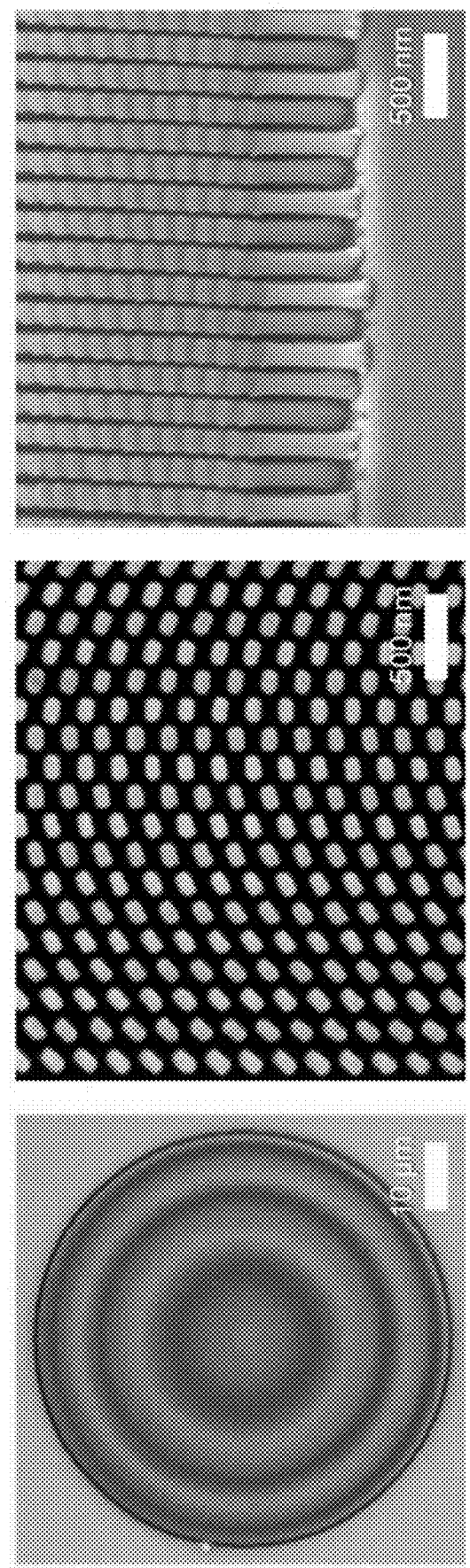
FIG. 9: Images of chromatic metalenses. LEFT PANEL: Optical image of the fabricated chromatic metalens. MIDDLE AND RIGHT PANELS: Zoom-in scanning electron microscope (SEM) images at the center (middle panel, top view) and the boundary of metalens (right panel, tilted view).

The light intensity profile after the incident beam going through the achromatic metalenses are experimentally examined using the optical system shown in FIG. 7. To properly select the circular polarization state at different focal planes, a couple of lenses, a quarter-wave plate, and a linear polarizer are mounted on a motorized stage and moved together along the light propagation direction. The upper panels in FIG. 3D show the measured cross-sectional intensity profiles for the achromatic metalens with a designed focal length f=235 μm and NA=0.106. For the wavelength ranging from 400 nm to 660 nm, the brightest spots are all close to the designed position (white dashed line). To further verify the optical performance of achromatic metalenses through GaN-based structures with design principle of IRUE, three lenses with different NA values are fabricated and experimentally examined (see FIG. 8 for sample images, the upper panels are SEM images of achromatic metalenses with NA=0.125, and the lower panels are SEM images of achromatic metalenses with NA=0.15). In FIG. 3D, the focal lengths were shown to remain unchanged within entire range of visible spectrum for all designed achromatic metalenses. It can be more clearly evaluated by looking at the focal length as a function of incident wavelength.

Figure 4A:
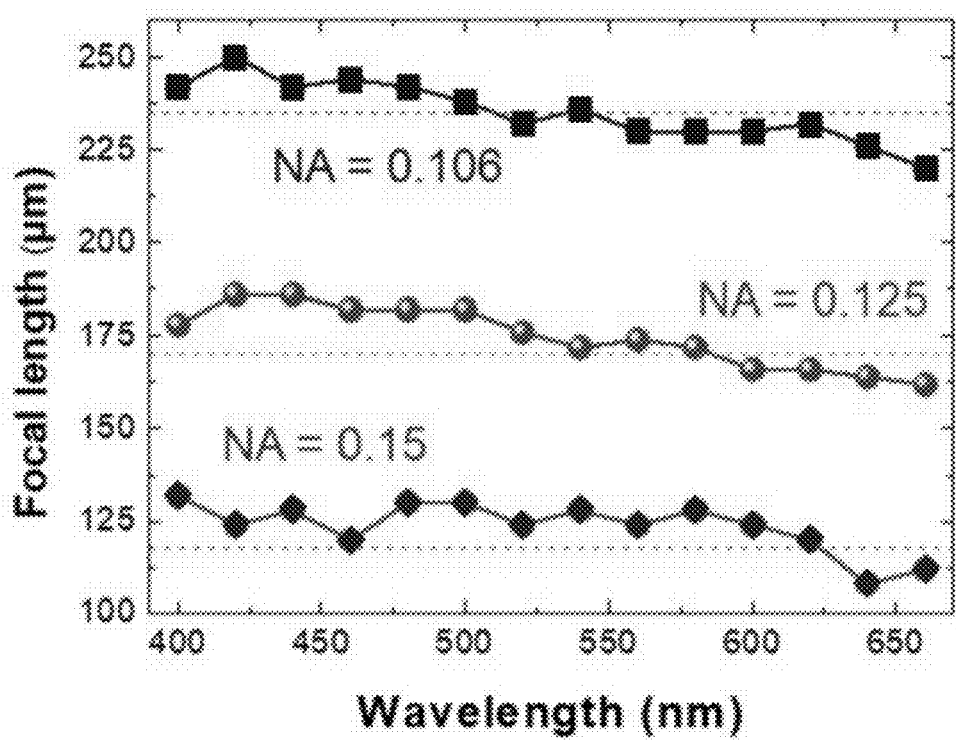
FIG. 4A shows the measured focal length as a function of incident wavelength obtained from three achromatic metalenses with different NA values.
Figure 4B:
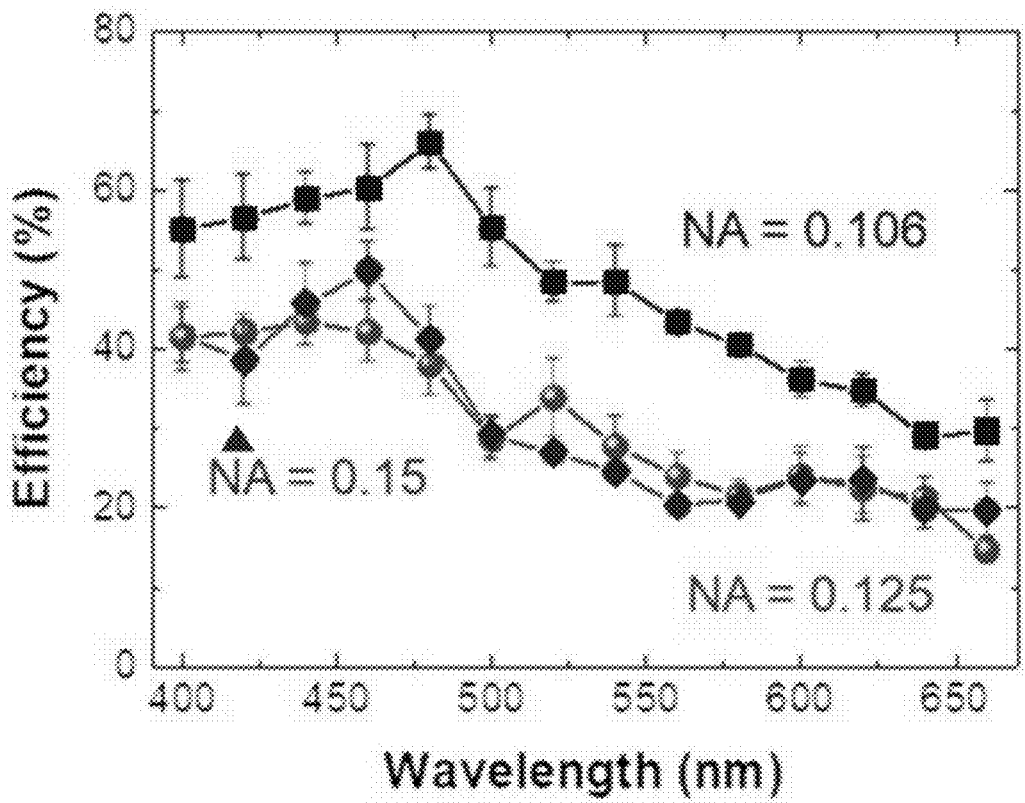
FIG. 4B shows the measured operation efficiency as a function of incident wavelength obtained from three achromatic metalenses with different NA values. Error bars: Standard deviation of measured efficiencies from four different samples.
Figure 4C:
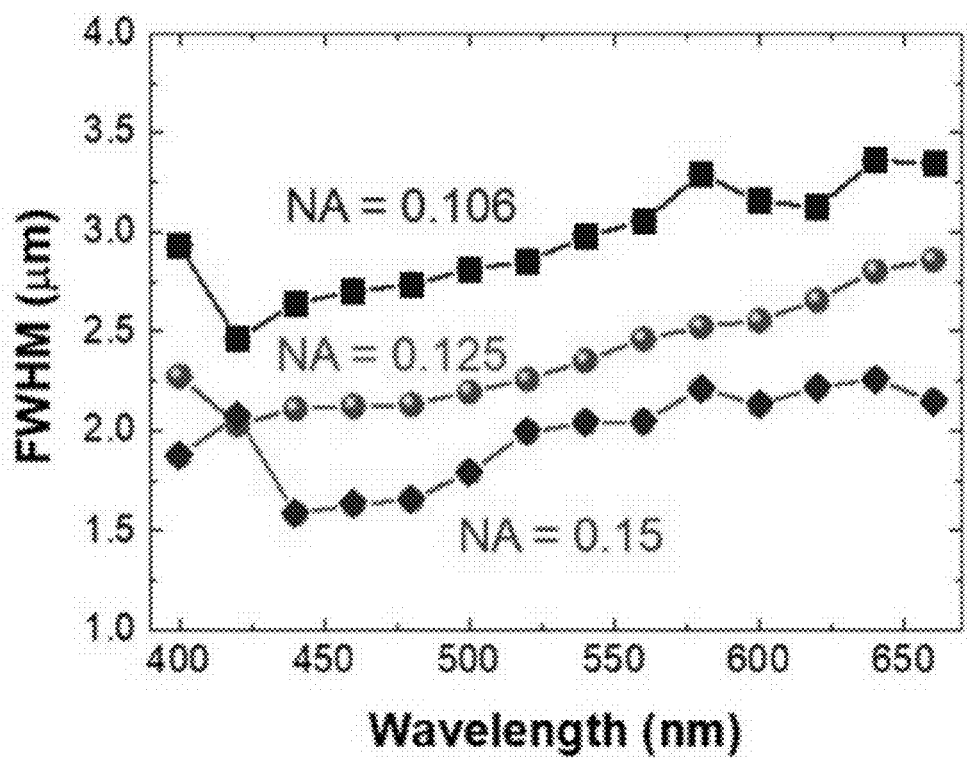
FIG. 4C shows the measured FWHM as a function of incident wavelength obtained from three achromatic metalenses with different NA values.

FIG. 4A shows the focal length as a function of incident wavelength for three achromatic metalenses. As predicted, all focal lengths almost keep unchanged when the incident wavelength varying over the entire range of visible spectrum. The working bandwidth is about 49% to the central wavelength (530 nm). FIG. 4B shows the measured focusing efficiency for three achromatic metalenses. The efficiency is defined as the ratio of the optical power of the focused circularly-polarized beam to the optical power of the incident beam with opposite helicity[20]. The highest efficiency can be up to 67%, while the average efficiency is about 40% over the whole working bandwidth. The efficiency spectra show variation with working wavelengths, which can be arose from two issues: (1) The fluctuations in the polarization conversion efficiency spectra of IRUEs (see FIGS. 6A to 6C); (2) the imperfect of fabricated samples. The first one can be addressed by further optimizing the structural configuration for making the efficiency spectra being smoother. Regarding the second point, to fairly evaluate the working efficiency of achromatic metalenses with imperfect fabrication, each point shown in FIG. 4B presents the average efficiency measured from four different samples. One can also find that the working efficiency shows relative low number at red light, which is regardless of the NA of metalenses. It is mainly from the strong radiative recombination and non-unity quantum yield of the used GaN thin film[38]. To especially improve the working efficiency at red light, one can improve the quality of GaN thin film through optimizing the epitaxial growth process[18]. All the measured focal spots perform the nearly ideal full-width half-maximum (FWHM) closed to the diffraction-limited values $$\left(\frac{\lambda}{2NA}\right),$$

as shown in FIG. 4C. These examinations reveal the approach based on this disclosure do extend the metalenses with achromatic property to the visible spectrum, which is of great interest in a huge number of optics communities, such as full-colour imaging systems, spectroscopy techniques, etc. It is worth mentioning that the size of achromatic metalenses is limited by the largest phase compensation, which can be significantly extended by introducing more integrated-resonances into the unit elements. For example, one can either reliably increase the thickness of GaN structures or use asymmetric shapes as the unit elements for exciting more plentiful resonant modes inside the dielectric structures.

Experimental Example 4

Imaging with Visible Achromatic Metalenses

To further demonstrate the practical use of optical imaging, a chromatic metalens (designed with normal P-B phase metasurfaces) is fabricated and compared its imaging performance with the achromatic metalens. The chromatic metalens (sample images can be found in FIG. 9) is designed for the green light (λ=500 nm, central wavelength of visible spectrum) with the same diameter and focal length as the achromatic sample of this work.

Figure 5A:
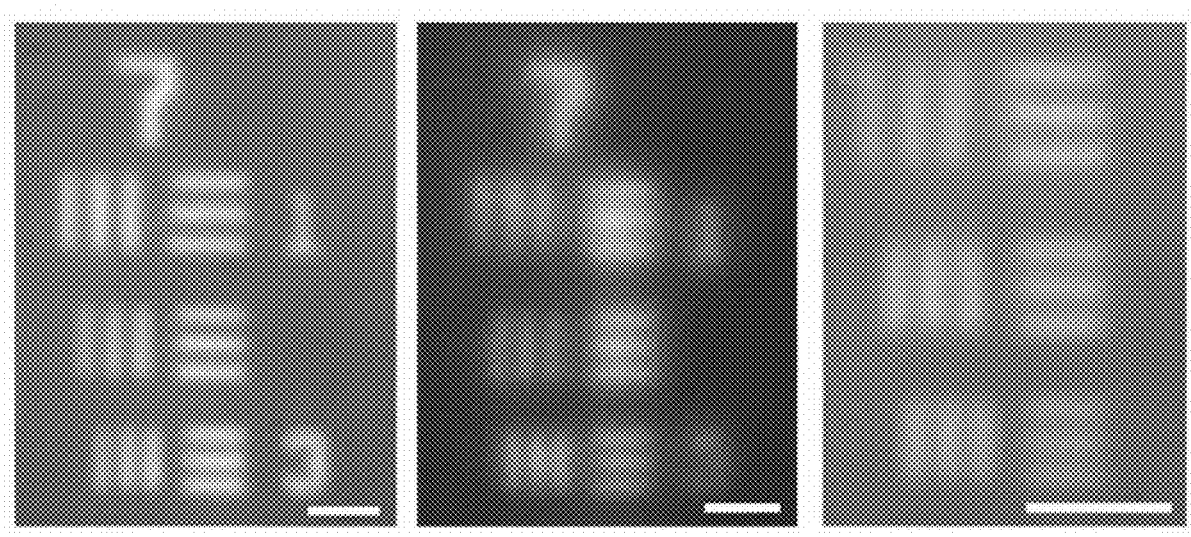
FIG. 5A demonstrates the images of 1951 USAF resolution test chart taken from the fabricated achromatic metalenses (left and right panels) with NA=0.106 and a chromatic metalenses (middle panel) with NA=0.106. Scale bars: 4 μm.
Figure 5B:
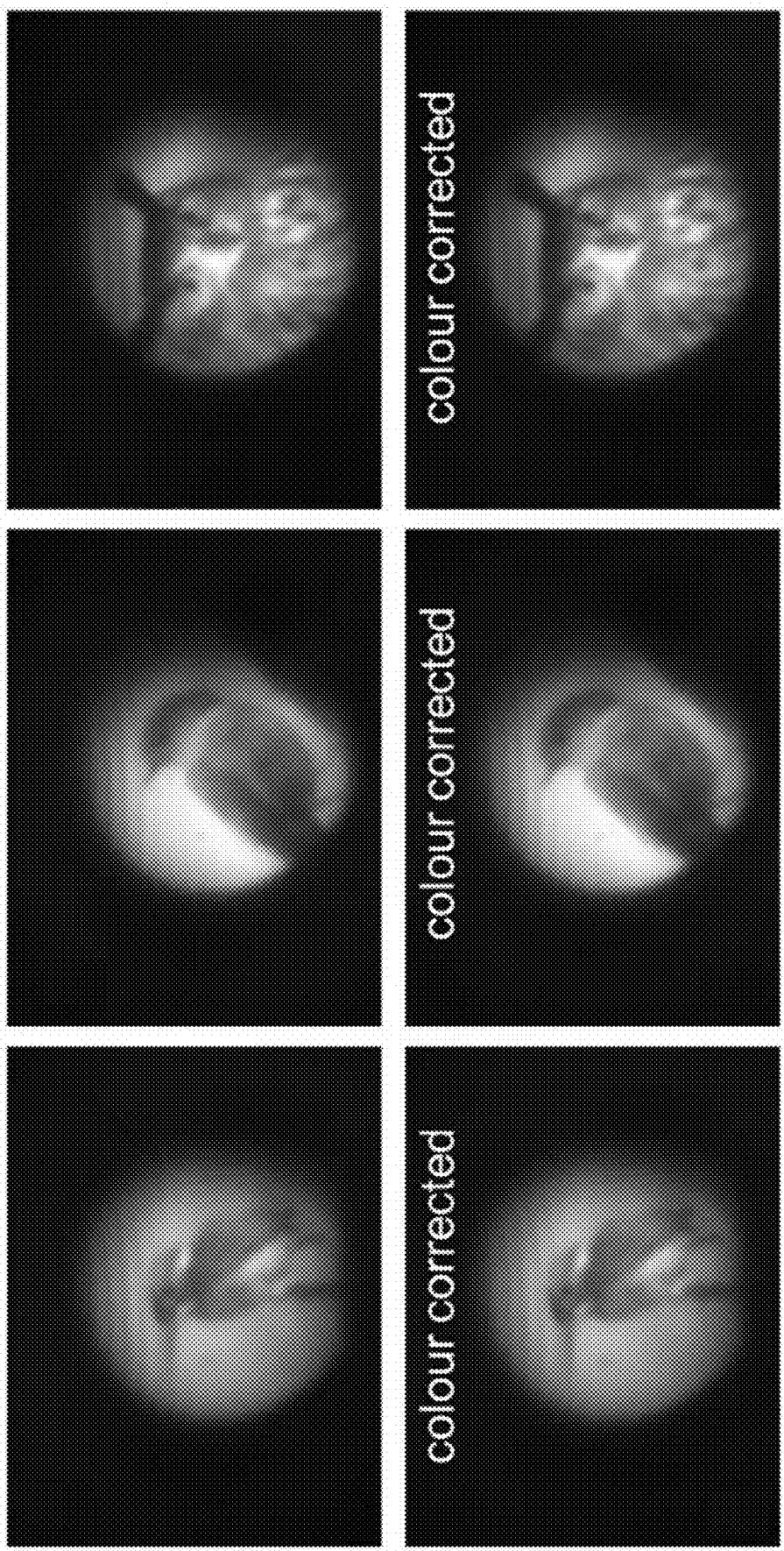
FIG. 5B demonstrates full-colour images formed by the achromatic metalens of Alcedinidae (left column), Erithacus rubecula (middle column) and Eurasian eagle owl (right column). The captured images from achromatic metalens are shown as before (upper row) and after (lower row) colour correction.
Figure 6A:
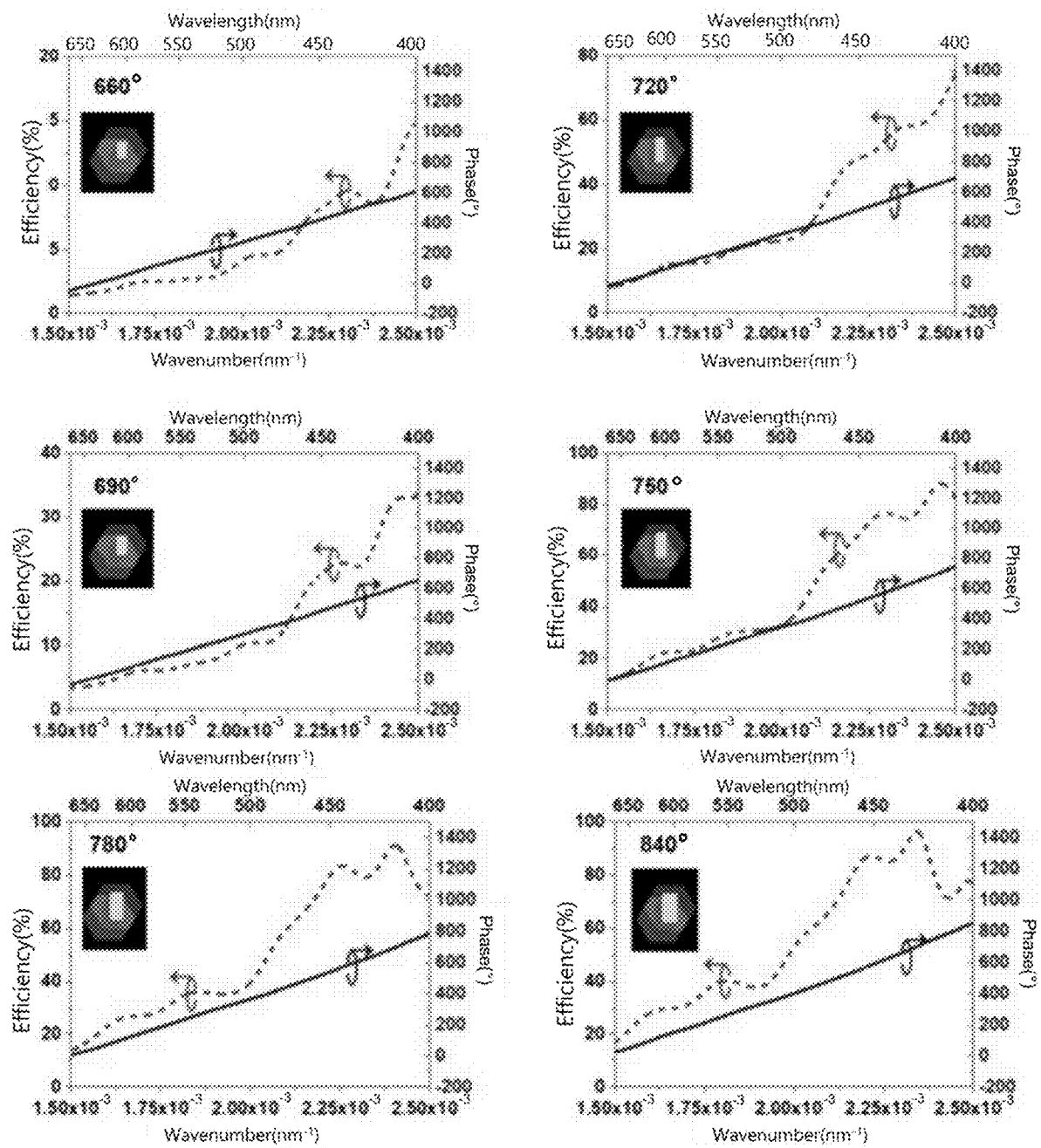
FIGS. 6A to 6C: Conversion efficiency and phase shift of 17 IRUEs. Simulated RCP-to-LCP conversion efficiency (red curves) and phase spectra (blue curves) of all 17 IRUEs for phase compensation from 660° to 1140°, with phase interval being 30°. The insets show the schematic for each structure.
Figure 6B:
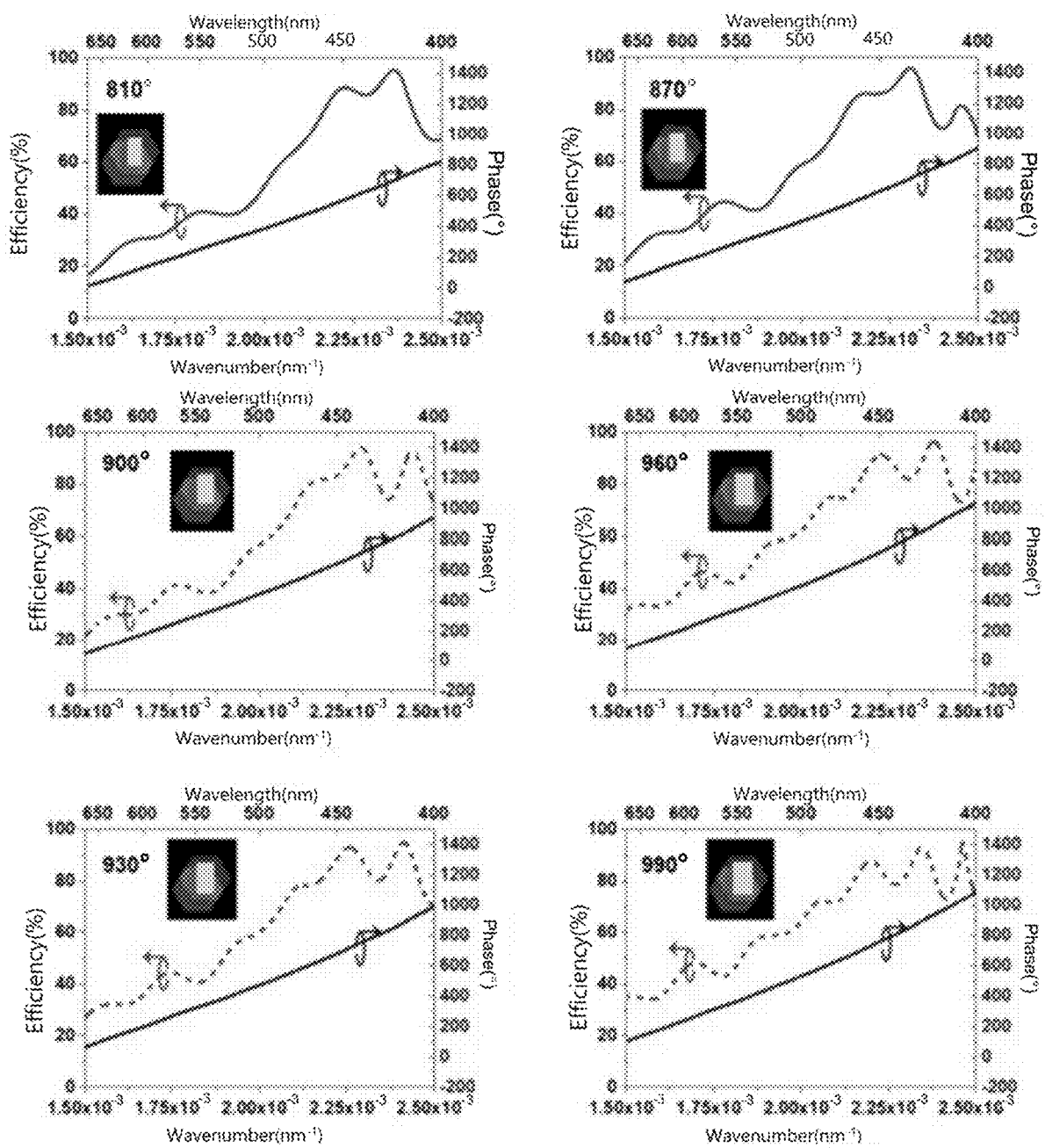
Figure 6C:
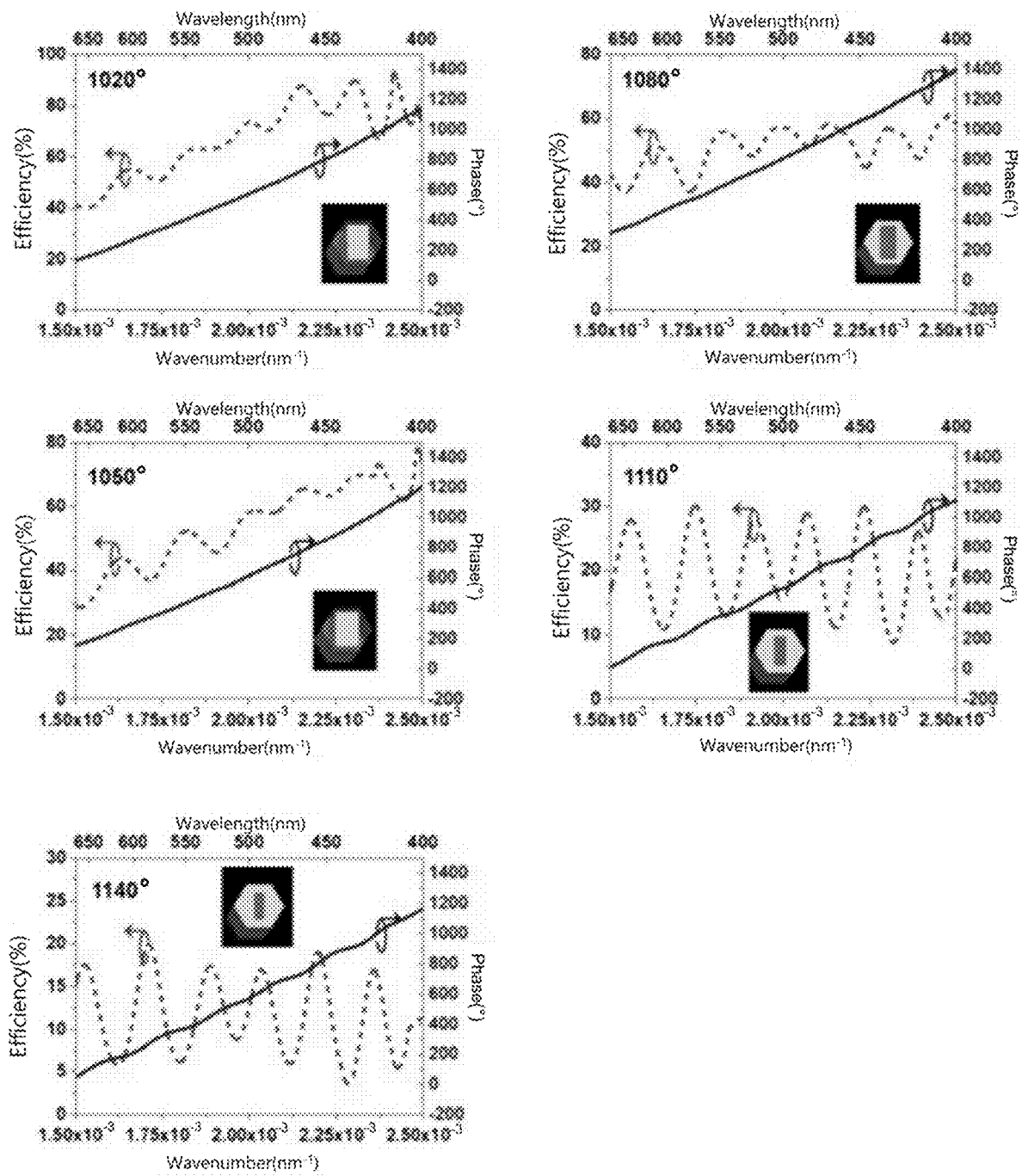
Figure 10:
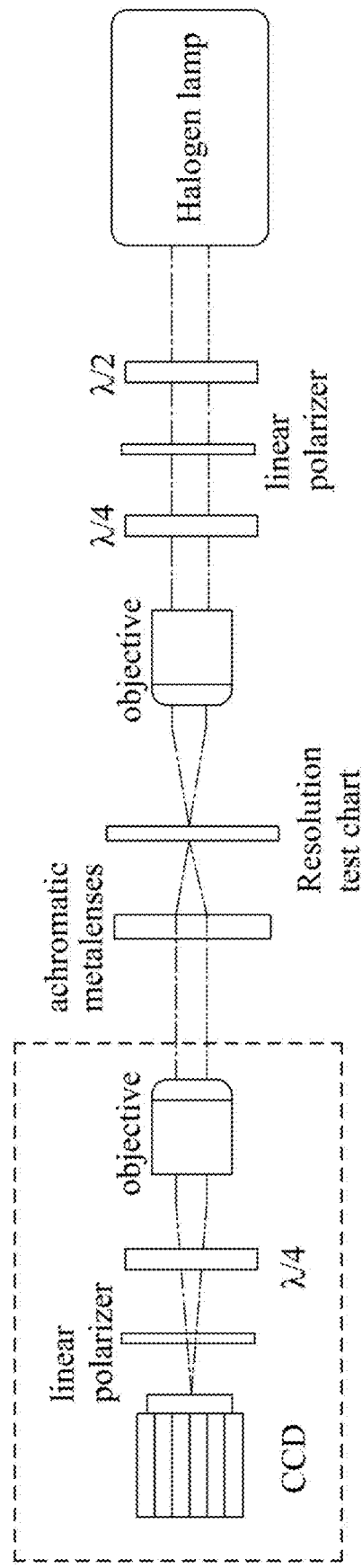
FIG. 10: Optical setup for imaging with broadband achromatic metalenses. A halogen lamp is used as the broadband light source for imaging the target object. A circular polarization state is also generated through a linear polarizer and a quarter-wave plate. The light passes through the target object is collected by the achromatic metalens with NA of 0.106, then another objective (50× magnification, NA=0.42) is used to image the target object in the CCD.

The 1951 United State Air Force (USAF) resolution test chart is firstly implemented as the imaging target, and was illuminated by a halogen light source. The optical configuration is shown in FIG. 10. Due to the use of P-B phase method, the images formed by the achromatic metalens can only be projected with a circularly-polarized light. A quarter-wave plate consequently is used to filter the image and improve the imaging quality. In FIG. 5A, the left panel and the middle panel show the comparison of the measured results from achromatic (left panel) and chromatic metalenses (middle panel). Due to the strong chromatic effect, the edges of lines images (middle panel in the FIG. 5A) taken from the chromatic metalens shows diverse colours, leading to vague features in images. On the other hand, the image (left panel in the FIG. 5A) taken from the achromatic metalens exhibits extremely clear line features, showing the chromatic effect is completely eliminated. Another image with smaller line features was sequentially taken in USAF using the achromatic metalens, as shown in the right panel of FIG. 5A. The smallest features of objects can be resolved are the lines with widths of ~2.19 µm, which is consistent to the measured FWHM shown in FIG. 4C. For an achromatic metalens working in a transmission scheme, where a clear white image can be obtained on the imaging plane. Any colorful target can be imaged with the proposed achromatic metalens. For example, FIG. 5B shows the full-colour images formed through achromatic metalens of this work, which further characterize its great imaging performance. Comparing with the original pictures (not shown here), the slight difference in colour is mainly from the efficiency variation from the fabricated achromatic metalens (see FIG. 4B). This can be corrected by compensating the intensity at three preliminary colours. After the colour correction, the images (the lower panels in FIG. 5B) present more reliable colours comparing with the original pictures (the upper panels in FIG. 5B). The intensity ratio of blue (440 nm) and red (660 nm) and green (540 nm) and red is modulated as 0.75 and 0.83, respectively, which is quite consistent with the measured efficiencies shown in FIG. 2B. All the images shown in FIGS. 5A and 5B demonstrate the effectiveness of elimination of chromatic effect by incorporating the IRUEs with P-B phase method over the entire visible spectrum.

CONCLUSIONS

In summary, this disclosure has shown broadband achromatic metalenses working in visible light region by utilizing a series of GaN-based resonant elements. The required phase profile for realizing an achromatic metalens is achieved by incorporating integrated-resonances with P-B phase method. Using 1951 USAF resolution test chart, this disclosure has demonstrated full-colour imaging performance. This work shows the broadest bandwidth for achromatic metalenses operate at visible light. It is also worth to notice that this is a state-of-the-art demonstration for a visible achromatic metalens working in a transmission fashion. Considering their compact size, these achromatic metalenses can be used in metalens arrays, which may be promising in achromatic imaging in light field camera[39]. Finally, the low-cost and semiconductor manufacture compatibility makes the metalens and optical component of this disclosure suitable for applications in nanophotonics and integrated optics in the visible.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

REFERENCES

1. Luo X. G. Principles of electromagnetic waves in metasurfaces. *SCIENCE CHINA Physics, Mechanics & Astronomy* 58, 594201-594201 (2015).
2. Pu M., Li X., Ma X., Wang Y., Zhao Z., Wang C., et al. Catenary optics for achromatic generation of perfect optical angular momentum. *Sc. Adv.* 1, e1500396 (2015).
3. Hsiao H.-H., Chu C. H., Tsai D. P. Fundamentals and applications of metasurfaces. *Small Methods* 1, 1600064 (2017).
4. Genevet P., Capasso F., Aieta F., Khorasaninejad M., Devlin R. Recent advances in planar optics: from plasmonic to dielectric metasurfaces. *Optica* 4, 139-152 (2017).
5. Yu N., Capasso F. Flat optics with designer metasurfaces. *Nat. Mater.* 13, 139-150 (2014).
6. Wu P. C., Tsai W.-Y., Chen W. T., Huang Y.-W., Chen T.-Y., Chen J.-W., et al. Versatile polarization generation with an aluminum plasmonic metasurface. *Nano Lett.* 17, 445-452 (2017).
7. Li L., Li T., Tang X.-M., Wang S.-M., Wang Q.-J., Zhu S.-N. Plasmonic polarization generator in well-routed beaming. *Light Sci. Appl.* 4, e330 (2015).
8. Wu P. C., Zhu W., Shen Z. X., Chong P. H. J., Ser W., Tsai D. P., et al. Broadband wide-Angle multifunctional polarization converter via liquid-metal-based metasurface. *Adv. Opt. Mater.* 5, 1600938 (2017).
9. Li X., Chen L., Li Y., Zhang X., Pu M., Zhao Z., et al. Multicolor 3D meta-holography by broadband plasmonic modulation. *Sci. Adv.* 2, e 1601102 (2016).
10. Huang L., Mühlenbernd H., Li X., Song X., Bai B., Wang Y., et al. Broadband hybrid holographic multiplexing with geometric metasurfaces. *Adv. Mater.* 27, 6444-6449 (2015).
11. Huang Y.-W., Chen W. T., Tsai W.-Y., Wu P. C., Wang C.-M., Sun G., et al. Aluminum plasmonic multicolor meta-hologram. *Nano Lett.* 15, 3122-3127 (2015).
12. Wu P. C., Papasimakis N., Tsai D. P. Self-affine graphene metasurfaces for tunable broadband absorption. *Phy. Rev. Applied* 6, 044019 (2016).
13. Sherrott M. C., Hon P. W. C., Fountaine K. T., Garcia J. C., Ponti S. M., Brar V. W., et al. Experimental demonstration of >230° phase modulation in gate-tunable graphene-gold reconfigurable mid-infrared metasurfaces. *Nano Lett.* 17, 3027-3034 (2017).
14. Thyagarajan K., Sokhoyan R., Zornberg L., Atwater H. A. Metasurfaces: Millivolt modulation of plasmonic metasurface optical response via ionic conductance. *Adv. Mater.* 29, 1701044 (2017).
15. Huang Y.-W., Lee H. W. H., Sokhoyan R., Pala R. A., Thyagarajan K., Han S., et al. Gate-tunable conducting oxide metasurfaces. *Nano Lett.* 16, 5319-5325 (2016).
16. Arbabi A., Arbabi E., Horie Y., Kamali S. M., Faraon A. Planar metasurface retroreflector. *Nat. Photon.* 11, 415-420 (2017).

17. Luo X., Ishihara T. Surface plasmon resonant interference nanolithography technique. *Appl. Phys. Lett.* 84, 4780-4782 (2004).
18. Chen B. H., Wu P. C., Su V.-C., Lai Y.-C., Chu C. H., Lee I. C., et al. GaN metalens for pixel-level full-color routing at visible light. *Nano Lett.* 17, 6345-6352 (2017).
19. Arbabi A., Horie Y., Bagheri M., Faraon A. Dielectric metasurfaces for complete control of phase and polarization with subwavelength spatial resolution and high transmission. *Nat. Nano.* 10, 937-943 (2015).
20. Khorasaninejad M., Chen W. T., Devlin R. C., Oh J., Zhu A. Y., Capasso F. Metalenses at visible wavelengths: Diffraction-limited focusing and subwavelength resolution imaging. *Science* 352, 1190-1194 (2016).
21. Khorasaninejad M., Aieta F., Kanhaiya P., Kats M. A., Genevet P., Rousso D., et al. Achromatic metasurface lens at telecommunication wavelengths. *Nano Lett.* 15, 5358-5362 (2015).
22. Aieta F., Kats M. A., Genevet P., Capasso F. Multiwavelength achromatic metasurfaces by dispersive phase compensation. *Science* 347, 1342-1345 (2015).
23. Avayu O., Almeida E., Prior Y., Ellenbogen T. Composite functional metasurfaces for multispectral achromatic optics. *Nat. Commun.* 8, 14992 (2017).
24. Hu J., Liu C.-H., Ren X., Lauhon L. J., Odom T. W. Plasmonic lattice lenses for multiwavelength achromatic focusing. *ACS Nano* 10, 10275-10282 (2016).
25. Khorasaninejad M., Shi Z., Zhu A. Y., Chen W. T., Sanjeev V., Zaidi A., et al. Achromatic metalens over 60 nm bandwidth in the visible and metalens with reverse chromatic dispersion. *Nano Lett.* 17, 1819-1824 (2017).
26. Arbabi E., Arbabi A., Kamali S. M., Horie Y., Faraon A. Controlling the sign of chromatic dispersion in diffractive optics with dielectric metasurfaces. *Optica* 4, 625-632 (2017).
27. Wang S., Wu P. C., Su V.-C., Lai Y.-C., Hung Chu C., Chen J.-W., et al. Broadband achromatic optical metasurface devices. *Nat. Commun.* 8, 187 (2017).
28. Khorasaninejad M., Chen W. T., Zhu A. Y., Oh J., Devlin R. C., Rousso D., et al. Multispectral chiral imaging with a metalens. *Nano Lett.* 16, 4595-4600 (2016).
29. Khorasaninejad M., Ambrosio A., Kanhaiya P., Capasso F. Broadband and chiral binary dielectric meta-holograms. *Sci. Adv.* 2, e1501258 (2016).
30. Hentschel M., Weiss T., Bagheri S., Giessen H. Babinet to the half: Coupling of solid and inverse plasmonic structures. *Nano Lett.* 13, 4428-4433 (2013).
31. Wen D., Chen S., Yue F., Chan K., Chen M., Ardron M., et al. Metasurface device with helicity-dependent functionality. *Adv. Opt. Mater.* 4, 321-327 (2016).
32. Zheng G., Mühlenbernd H., Kenney M., Li G., Zentgraf T., Zhang S. Metasurface holograms reaching 80% efficiency. *Nat. Nano.* 10, 308-312 (2015).
33. Kamali S. M., Arbabi A., Arbabi E., Horie Y., Faraon A. Decoupling optical function and geometrical form using conformal flexible dielectric metasurfaces. *Nat. Commun.* 7, 11618 (2016).
34. Arbabi A., Horie Y., Ball A. J., Bagheri M., Faraon A. Subwavelength-thick lenses with high numerical apertures and large efficiency based on high-contrast transmitarrays. *Nat. Commun.* 6, 7069 (2015).
35. Wang P., Mohammad N., Menon R. Chromatic-aberration-corrected diffractive lenses for ultra-broadband focusing. *Sci. Rep.* 6, 21545 (2016).
36. Li Y., Li X., Pu M., Zhao Z., Ma X., Wang Y., et al. Achromatic flat optical components via compensation between structure and material dispersions. *Sci. Rep.* 6, 19885 (2016).
37. Devlin R. C., Khorasaninejad M., Chen W. T., Oh J., Capasso F. Broadband high-efficiency dielectric metasurfaces for the visible spectrum. *Proceedings of the National Academy of Sciences* 113, 10473-10478 (2016).
38. Goldys E. M., Godlewski M., Langer R., Barski A., Bergman P., Monemar B. Analysis of the red optical emission in cubic GaN grown by molecular-beam epitaxy. *Phys. Rev. B* 60, 5464-5469 (1999).
39. Ng, R., Levoy, M., Bredif, M., Duval, G., Horowitz, M., Hanrahan, P. Light field photography with a hand-held plenoptic camera. *Stanford University Computer Science Tech Report CSTR* 2005-02, April 2005.
40. Kamali S. M, Arbabi E., Arbabi A., Horie Y., Faraji-Dana M., Faraon A. Angle-multiplexed metasurfaces: encoding independent wavefronts in a single metasurface under different illumination angles. *Phys. Rev. X* 7, 041056 (2017).

What is claimed is:

1. An optical component comprising an array of metalenses, wherein each metalens comprises a plurality of nanostructures and a dielectric layer, wherein the nanostructures are disposed on the dielectric layer, and the nanostructures comprise:
    an array of first phase compensation structures; and
    an array of second phase compensation structures, wherein the array of the first phase compensation structures are disposed to surround the array of the second phase compensation structures so as to define a single metalens, the first and second phase compensation structures are complementary to each other and substantially satisfy the Babinet's principle.

2. The optical component according to claim 1, wherein each first phase compensation structure is a nanopillar, each second phase compensation structure is a nanopore.

3. The optical component according to claim 2, wherein each of the first nanopillars has a length ranging from 80 to 165 nm, a width ranging from 45 to 110 nm and a height of 800 nm.

4. The optical component according to claim 2, wherein each of the nanopores has a length ranging from 125 to 163 nm, a width ranging from 50 to 80 nm, and a height of 800 nm.

5. The optical component according to claim 1, wherein each metalens has a phase profile which satisfy the following equations (A) to (D), $$\varphi_{AL}(r, \lambda) = -\left[\frac{2\pi}{\lambda}\left(\sqrt{r^2 + f^2} - f\right)\right] + \varphi_{shift}(\lambda) \quad (A)$$

$$\varphi_{shift}(\lambda) = \frac{a}{\lambda} + b \quad (B)$$

$$a = \delta \frac{\lambda_{min}\lambda_{max}}{\lambda_{max} - \lambda_{min}} \quad (C)$$

$$b = -\delta \frac{\lambda_{min}}{\lambda_{max} - \lambda_{min}} \quad (D)$$

where $\varphi_{AL}$ is a phase retardation of an arbitrary point on a surface of the metalens, r is a distance between said arbitrary point and a center on said surface of the metalens, $\lambda$ is a working wavelength in free space, f is a designed focal length, $\lambda_{min}$ and $\lambda_{max}$ are boundaries of an interest wavelength band, and δ is a largest additional phase shift between $\lambda_{min}$ and $\lambda_{max}$ at the center of the metalens.

6. The optical component according to claim 1, wherein the first phase compensation structures have phase compensations ranging from 660 degree (°) to 1050 degree (°).

7. The optical component according to claim 6, wherein the second phase compensation structures have phase compensations ranging from 1080 degree (°) to 1140 degree (°).

8. The optical component according to claim 1, wherein each first phase compensation structure and each second phase compensation structure are made of a transparent material which is selected from the group consisting of gallium nitride (GaN), gallium phosphide (GaP), aluminum arsenide (AlAs), aluminum gallium arsenide (AlGaAs), titanium dioxide (TiO$_2$), silicon (Si) and silicon nitride (Si$_3$N$_4$).

9. The optical component according to claim 1, the first and second phase compensation structures are in a periodic hexagonal lattice.

10. The optical component according to claim 1, wherein the dielectric layer is made of a material which is selected from the group consisting of ITO, Al:ZnO, Ga:ZnO, MgF$_2$, HfO$_2$, Si$_3$N$_4$, SiO$_2$ and Al$_2$O$_3$.

11. The optical component according to claim 1, wherein each metalens is transparent.

12. The optical component according to claim 1, wherein focal lengths of all metalenses are the same.

13. The optical component according to claim 1, wherein at least one of the metalens has a focal length which is different from that of another metalens.

14. The optical component according to claim 1, wherein the array of the first phase compensation structures surrounds the array of the second phase compensation structures concentrically.

* * * * *